United States Patent
Elshafie et al.

(10) Patent No.: US 11,909,483 B2
(45) Date of Patent: Feb. 20, 2024

(54) CSI BASED ON CODE BLOCK SEGMENTATION

(71) Applicant: QUALCOMM Incorporated, San Diego, CA (US)

(72) Inventors: Ahmed Elshafie, San Diego, CA (US); Yi Huang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 17/447,049

(22) Filed: Sep. 7, 2021

(65) Prior Publication Data

US 2023/0076705 A1 Mar. 9, 2023

(51) Int. Cl.
*H04L 5/12* (2006.01)
*H04B 7/06* (2006.01)
*H04W 24/10* (2009.01)
*H04B 17/318* (2015.01)

(52) U.S. Cl.
CPC ......... *H04B 7/0626* (2013.01); *H04B 17/318* (2015.01); *H04W 24/10* (2013.01)

(58) Field of Classification Search
CPC .... H04B 7/0626; H04B 17/318; H04W 24/10
USPC ......................................................... 375/262
See application file for complete search history.

(56) References Cited

U.S. PATENT DOCUMENTS

| | | | | |
|---|---|---|---|---|
| 10,291,356 B2 * | 5/2019 | Nammi | ................ | H04L 1/0047 |
| 10,742,271 B2 * | 8/2020 | Nammi | ................ | H04W 4/027 |
| 11,139,923 B2 * | 10/2021 | Andersson | ............ | H04L 1/1819 |
| 11,159,283 B2 * | 10/2021 | Cheng | .................. | H04L 5/0055 |
| 11,178,572 B2 * | 11/2021 | Baek | ........................ | H04L 65/40 |
| 2016/0226643 A1 * | 8/2016 | Mallik | .................. | H04L 1/1819 |
| 2016/0294512 A1 * | 10/2016 | Noh | ....................... | H03M 13/35 |

FOREIGN PATENT DOCUMENTS

DE 2645611 A1 * 10/2013

\* cited by examiner

*Primary Examiner* — Helene E Tayong
(74) *Attorney, Agent, or Firm* — QUALCOMM Incorporated

(57) ABSTRACT

Aspects are provided which allow a base station to segment a code block into individual code block segments and a UE to determine and indicate a quality of the individual code block segments in a CSI report to a base station. The base station transmits a code block to the UE which includes a plurality of code block segments. The UE determines a code block segment quality of each of the code block segments, and sends a CSI report including one or more of the code block segment qualities to the base station. Thus, the code block segment qualities indicated by the UE allow the base station to determine which segments of the code block should be re-transmitted, for example, based on a best RV to be applied for the code block retransmission, thereby improving retransmission performance.

30 Claims, 14 Drawing Sheets

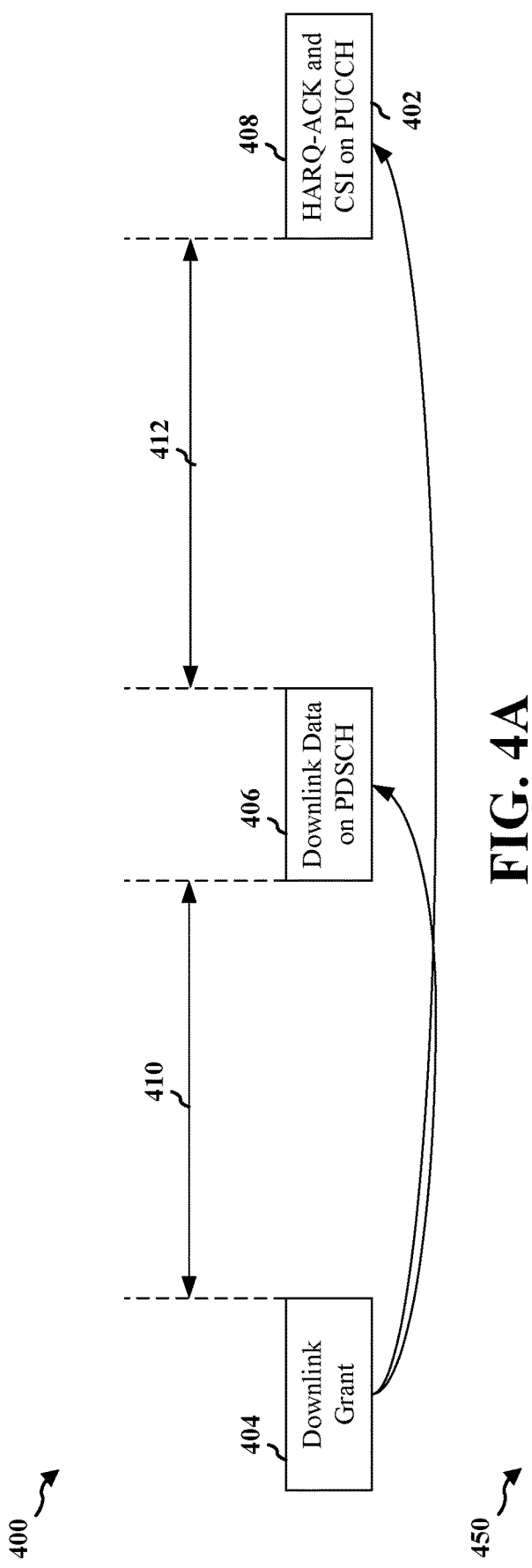
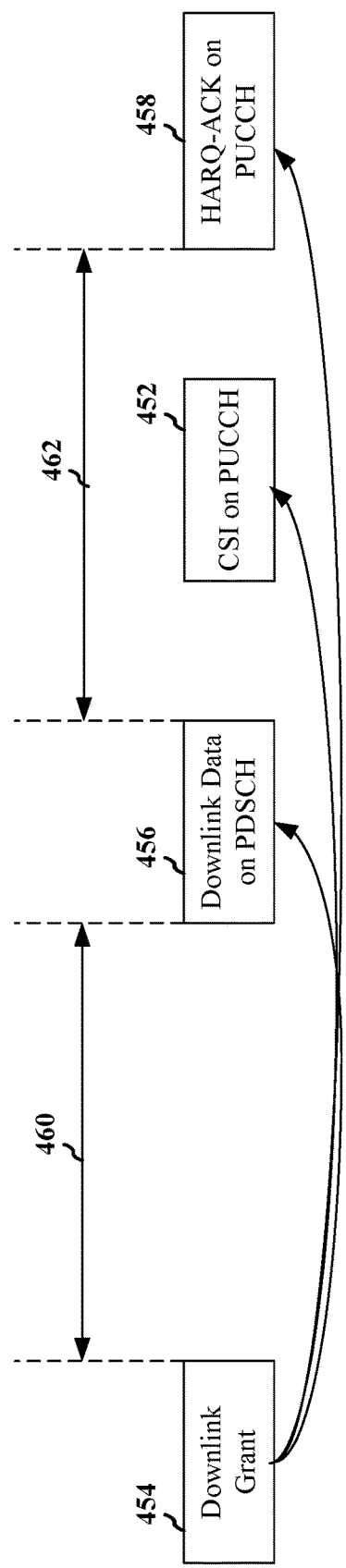
FIG. 4A
FIG. 4B

CSI BASED ON CODE BLOCK SEGMENTATION

BACKGROUND

Technical Field

The present disclosure generally relates to communication systems, and more particularly, to a wireless communication system between a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives a code block from a base station which includes a plurality of code block segments. The UE determines a code block segment quality of each of the code block segments. The UE sends a channel state information (CSI) report including one or more of the code block segment qualities.

In an aspect of the disclosure, a method, a computer-readable medium, and an apparatus are provided. The apparatus may be a base station. The base station transmits a code block to a UE which includes a plurality of code block segments. The base station receives a CSI report including a code block segment quality for each of one or more of the code block segments.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 4A and 4B are diagrams illustrating example transmissions of an aperiodic CSI report in response to a downlink grant.

DETAILED DESCRIPTION

Figure 1:
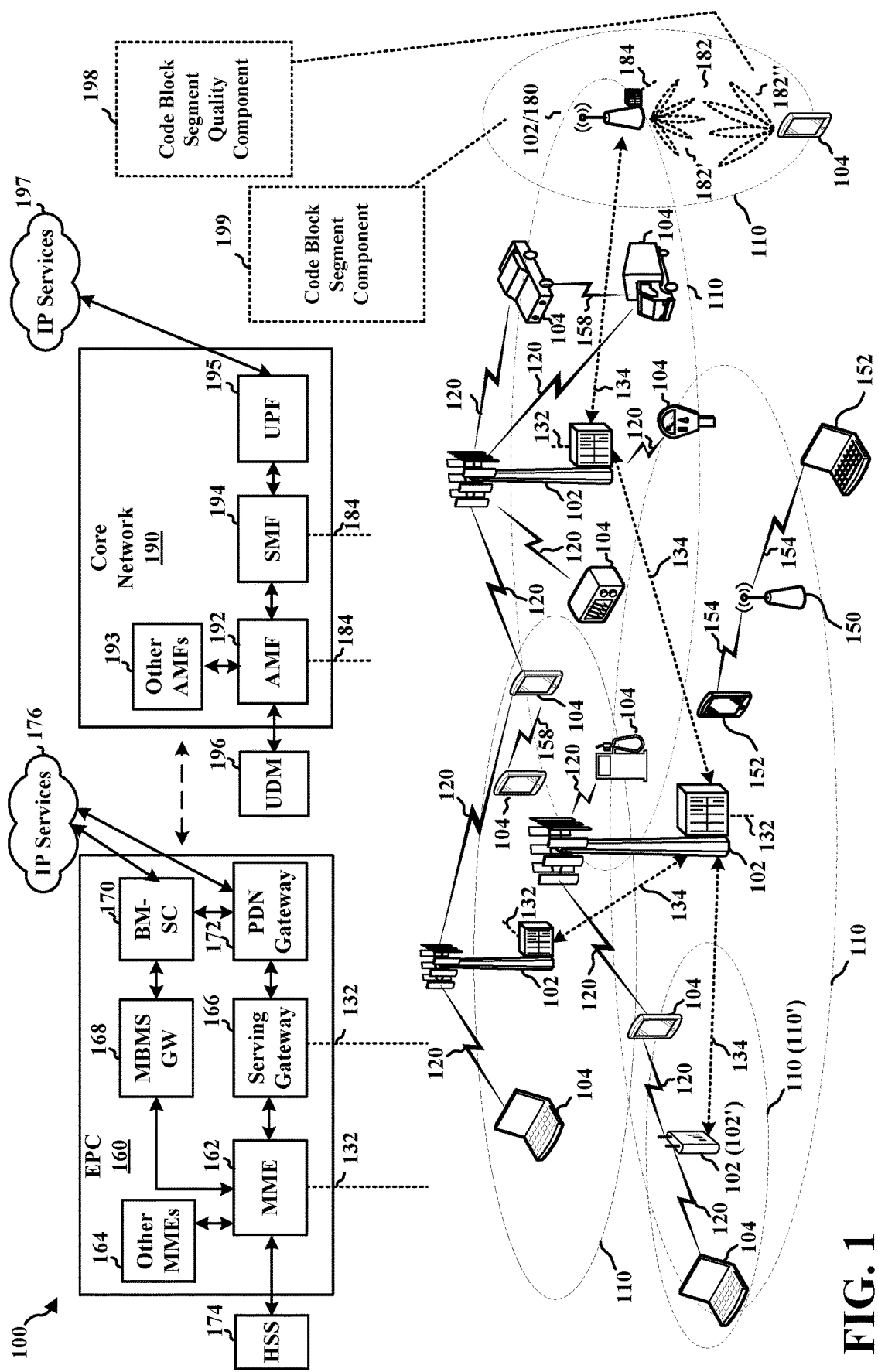
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

When a UE communicates with a base station over a wireless channel, the UE may measure channel quality and report channel quality measurement results to the base station. For example, the base station may transmit one or more CSI reference signals (CSI-RS) to the UE, and the UE may measure a signal-to-noise ratio (SNR) (or signal to noise interference ratio (SINR)) of the channel based on a reference signal received power (RSRP) or received signal strength indicator (RSSI) of the CSI-RS. Here, SNR and SINR are referred to interchangeably, and thus any reference to SNR may be substituted with SINR or vice-versa throughout this disclosure. The UE may also measure SINR or perform other channel quality measurements based on other signals than CSI-RS, such as demodulation reference signals (DMRS) or other signals on a physical downlink shared channel (PDSCH) that may assist the UE in decoding the PDSCH. The UE may then identify CSI based on the measured RSRP/RSSI/SINR and provide a CSI report to the base station including one or more reporting parameters indicating the channel quality measurement results. For example, the UE may report a channel quality indicator (CQI), a precoding matrix indicator (PMI), a rank indicator (RI), a layer indicator (LI), or other types of CSI (e.g. L1-RSRP, etc.) based on the CSI-RS, DMRS, or other PDSCH signals.

The base station may transmit a downlink grant to the UE (e.g. downlink control information (DCI) scheduling a PDSCH transmission) which triggers aperiodic CSI feedback. Typically, an aperiodic CSI report is based on aperiodic CSI (e.g., include CQI associated with SNR measurements of aperiodic CSI-RS). However, in some cases the aperiodic CSI report may be based on PDSCH decoding (e.g., include CQI associated with SNR measurements of DMRS). In such cases, since the UE may measure CSI from the data received in PDSCH itself, the base station may not transmit CSI-RS, thereby saving resources. Moreover, in response to the CSI report, the base station may adjust a modulation and coding scheme (MCS) or other parameters to result in more reliable or faster, subsequent downlink transmissions. Thus, downlink grant-triggered, aperiodic CSI reporting based on PDSCH decoding may support reduced latency and increased reliability in communications.

Typically, the UE provides such aperiodic CSI in response to entire code blocks of a code block group (CBG). For example, if the base station sends a downlink grant scheduling a group of code blocks associated with a given redundancy version (RV) to the UE, but the UE fails to decode one of the scheduled code blocks due to a portion of that code block having low log-likelihood ratio (LLR) quality, the UE may report a non-acknowledgment for the entire code block to the base station in a CSI report. In response to receiving the non-acknowledgment for the entire code block, the base station may not be able to determine which portion(s) of the code block actually resulted in the decoding failure, and thus the base station may select a sub-optimal RV for code block retransmission which may lead to inefficient re-sending of code block portions having high LLR quality. Such retransmission from the base station may waste time and resources of both the base station and the UE.

Accordingly, to improve retransmission of such code blocks, aspects of the present disclosure allow the base station to divide a code block into code block segments, and allow the UE to indicate a quality of individual code block segments in the CSI report. In this way, the base station may determine which segments or portions of a code block are to be re-transmitted, for example, based on a best RV to be applied for the code block retransmission. For instance, the UE may report to the base station if a certain code block segment has low LLR quality, and the base station may select a new RV for code block re-transmission which optimally encompasses the low LLR quality segment. As a result, such optimal RV selection allows the base station to retransmit mostly the low quality bits of a code block, rather than inefficiently retransmitting a significant amount of high quality bits with a different RV. Therefore, by reporting individual code block segment qualities in CSI, the UE may effectively recommend a hybrid automatic repeat request (HARQ) RV sequence for the base station to apply in its retransmissions, thus improving retransmission performance.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station.

Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may include a code block segment quality component 198 that is configured to receive a code block from a base station, the code block including a plurality of code block segments; determine a code block segment quality of each of the code block segments; and send a CSI report including one or more of the code block segment qualities.

Referring again to FIG. 1, in certain aspects, the base station 180 may include a code block segment component 199 that is configured to transmit a code block to a UE, the code block including a plurality of code block segments; and receive a CSI report including a code block segment quality for each of one or more of the code block segments.

Figure 2:
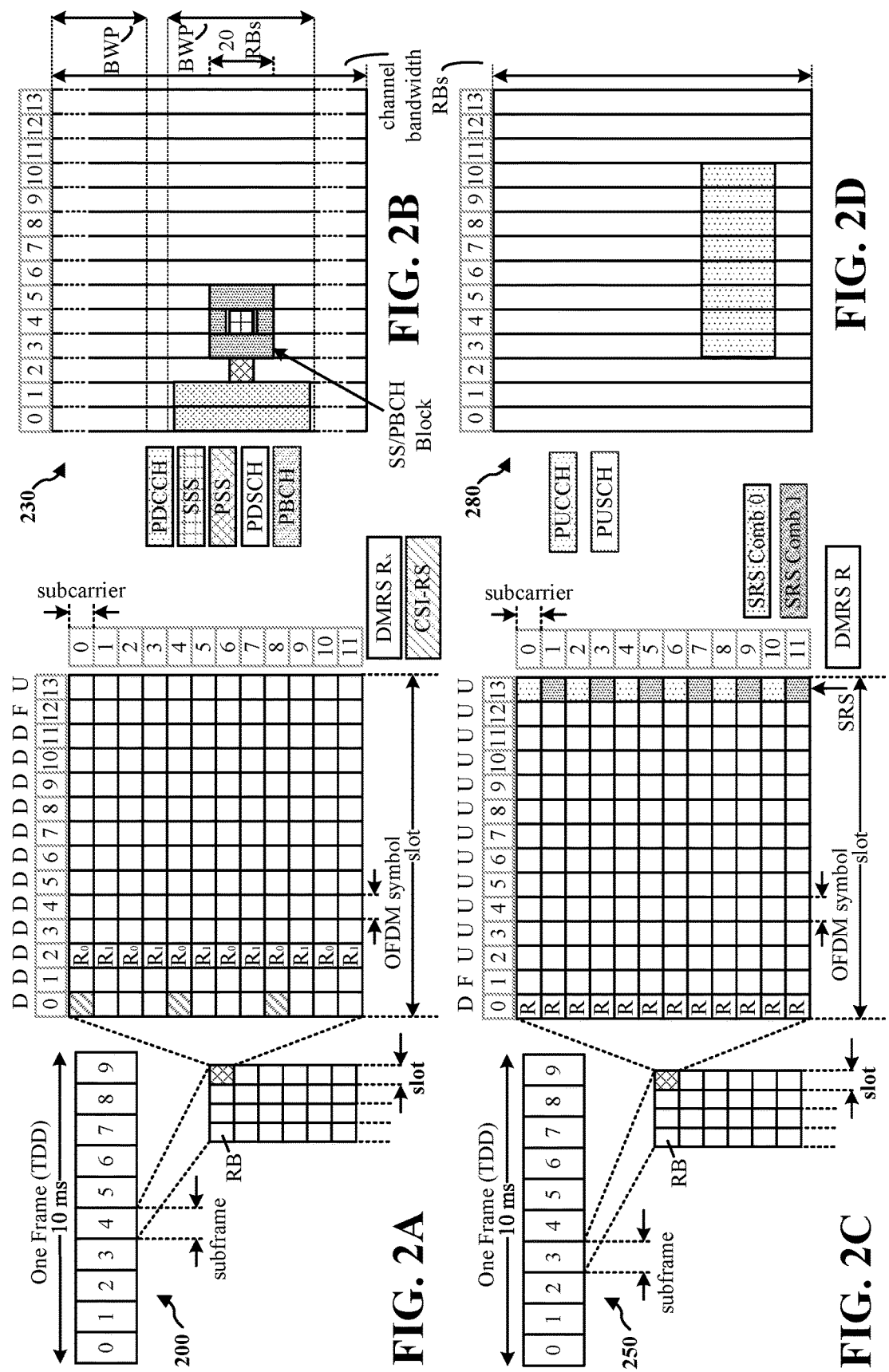
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
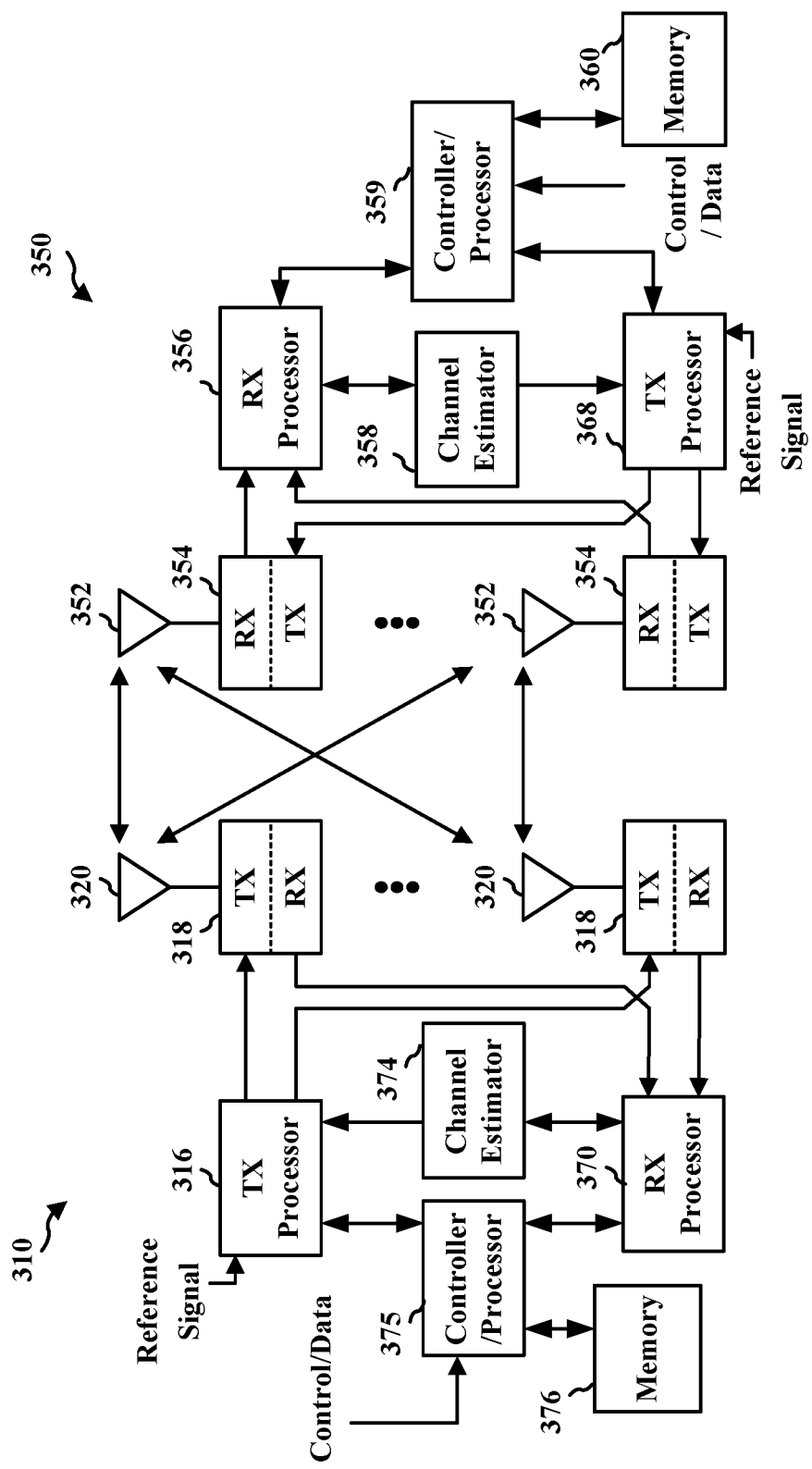
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting;

PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with code block segment quality component 198 of FIG. 1.

At least one of the TX processor 316, the RX processor 370, and the controller/processor 375 may be configured to perform aspects in connection with code block segment component 199 of FIG. 1.

When a UE communicates with a base station over a wireless channel, the UE may measure channel quality and report channel quality measurement results to the base station. For example, the base station may transmit one or more CSI-RS to the UE, and the UE may measure a SNR or SINR of the channel based on RSRP or RSSI of the CSI-RS. Here, SNR and SINR are referred to interchangeably, and thus any reference to SNR may be substituted with SINR or vice-versa throughout this disclosure. The UE may also measure SINR or perform other channel quality measurements based on other signals than CSI-RS, such as DMRS or other signals on a PDSCH that may assist the UE in decoding the PDSCH. The UE may then identify CSI based on the measured RSRP/RSSI/SINR and provide a CSI report to the base station including one or more reporting parameters indicating the channel quality measurement results. For example, the UE may report a CQI, a PMI, a RI, a LI, or other types of CSI (e.g. L1-RSRP, etc.) based on the CSI-RS, DMRS, or other PDSCH signals.

The base station may schedule the UE to provide CSI reports to the base station periodically, semi-persistently, or aperiodically. For example, the base station may transmit a RRC configuration to the UE scheduling periodic CSI-RS transmissions and CSI feedback on PUCCH. In another example, the base station may transmit to the UE a MAC-CE or DCI which triggers semi-persistently scheduled CSI-RS transmissions and CSI feedback. The UE may provide the semi-persistent CSI feedback on PUCCH in response to a MAC-CE or on PUSCH in response to a DCI. In a further example, the base station may transmit an uplink grant to the UE (e.g. a DCI scheduling a PUSCH transmission) which triggers aperiodic CSI-RS transmissions and CSI feedback. The UE may provide the aperiodic CSI feedback on PUSCH in response to the DCI.

Additionally, the base station may transmit a downlink grant to the UE (e.g. a DCI scheduling a PDSCH transmission) which triggers aperiodic CSI feedback. For example, the base station may provide DCI including a CSI trigger field (spanning a number Z bits), which indicates a CSI trigger state including a CSI report setting, and the UE may measure CSI and transmit the aperiodic CSI report in response to the DCI. The UE may provide the aperiodic CSI feedback on PUCCH in response to the DCI, as well as HARQ-ACK feedback on PUCCH in response to downlink data scheduled by the DCI. For example, when the downlink grant triggers an aperiodic CSI report, the UE may multiplex the aperiodic CSI report and the HARQ-ACK feedback in the same PUCCH resource (e.g., within a slot(s), subframe (s), or frame(s) scheduled for a single PUCCH transmission), or the UE may transmit the aperiodic CSI report and the HARQ-ACK feedback in separate PUCCH resources (e.g., within slot(s), subframe(s), or frame(s) respectively scheduled for different PUCCH transmissions).

Typically, an aperiodic CSI report is based on aperiodic CSI (e.g., include CQI associated with SNR measurements of aperiodic CSI-RS). However, in some cases the aperiodic CSI report may be based on PDSCH decoding (e.g., include CQI associated with SNR measurements of DMRS or based on LLRs of the downlink data). In such cases, since the UE may measure CSI from the data received in PDSCH itself, the base station may not transmit CSI-RS, thereby saving resources. Moreover, in response to the CSI report, the base station may adjust MCS or other parameters to result in more reliable or faster, subsequent downlink transmissions. Thus, downlink grant-triggered, aperiodic CSI reporting based on PDSCH decoding may support reduced latency and increased reliability in communications.

FIGS. 4A and 4B illustrate examples 400, 450 where a UE transmits an aperiodic CSI report 402, 452 on PUCCH in response to a downlink grant 404, 454 from a base station, where downlink grant 404, 454 schedules downlink data 406, 456 on PDSCH, and where the UE transmits HARQ-ACK feedback 408, 458 on PUCCH in response to the downlink data. In particular, FIG. 4A illustrates the example where the UE transmits the HARQ-ACK feedback 408 and aperiodic CSI report 402 in the same PUCCH resource, while FIG. 4B illustrates the example where the UE transmits the HARQ-ACK feedback 458 and the aperiodic CSI report 452 in separate PUCCH resources. In these examples, the aperiodic CSI feedback may be based on DMRS or other downlink signals in PDSCH for decoding the downlink data 406, 456, rather than based on CSI-RS, in order to support reduced latency and increased reliability in communications.

In the examples of FIGS. 4A and 4B, the UE may first receive downlink grant 404, 454 which schedules the PDSCH transmission including the downlink data 406, 456. The downlink grant 404, 454 may also indicate a slot offset index 410, 460 (e.g. K0), which may indicate the slot at which the base station transmits the PDSCH. The downlink grant may further indicate to the UE whether to transmit the aperiodic CSI report 402, 452 and the HARQ-ACK feedback 408, 458 in the same PUCCH resource or in different PUCCH resources. In response to receiving the downlink grant triggering aperiodic CSI reporting, the UE may measure CSI based on the PDSCH including the downlink data 406, 456 (for example, by identifying CQI based on the RSRP or RSSI of the DMRS), and the UE may provide the CSI to the base station in the aperiodic CSI report 402, 452. The UE may also provide the HARQ-ACK feedback 408, 458 to the base station in response to the downlink data 406, 456 after a slot offset 412, 462 following receipt of the downlink data (e.g. K1). After receiving the CSI report, the base station may modify, MCS, rank, RB allocation, precoder, transmission power, or other parameters for subsequent downlink data transmissions accordingly.

Thus, in response to a downlink grant, a UE may provide aperiodic CSI on PUCCH with HARQ-ACK feedback in the same PUCCH resources or in separate PUCCH resources. Typically, the UE provides such aperiodic CSI in response to entire code blocks of a CBG. For example, if the base station sends a downlink grant scheduling a group of code blocks associated with a given RV to the UE, but the UE fails to decode one of the scheduled code blocks due to a portion of that code block having low LLR quality, the UE may report a non-acknowledgment for the entire code block to the base station in a CSI report. For example, the portion of a code block may have low LLR quality if that portion includes a large number of LLRs with a value of or approximately 0, or a large number of ambiguous bit values (either 0 or 1). In response to receiving the non-acknowledgment for the entire code block, the base station may not be able to determine which portion(s) of the code block actually resulted in the decoding failure, and thus the base station may select a sub-optimal RV for code block retransmission which may lead to inefficient re-sending of code block portions having high LLR quality. For example, the base station may inefficiently resend portions of a code block including a large number of LLRs with a positive or negative value, or a large number of unambiguous bit values, which the UE was able to decode and therefore did not need to be resent. Such retransmission from the base station may waste time and resources of both the base station and the UE.

Accordingly, to improve retransmission of such code blocks, aspects of the present disclosure allow the base station to divide a code block into code block segments, and allow the UE to indicate a quality of individual code block segments in the CSI report. In this way, the base station may determine which segments or portions of a code block are to be re-transmitted, for example, based on a best RV to be applied for the code block retransmission. For instance, the UE may report to the base station if a certain code block segment has low LLR quality, and the base station may select a new RV for code block re-transmission which optimally encompasses the low LLR quality segment. For example, assume the base station selects to initially transmit a code block with RV 0, which is typically one of four selectable RVs (RV 0, 1, 2, or 3) each encompassing a different starting bit in a circular buffer storing the code block. RV 0 and RV 3 are typically used for initial transmissions since these RVs include systematic bits (information bits) as well as parity bits and are therefore self-decodable at the UE, while RV 1 and RV 2 are typically used for retransmissions since these RVs only include parity bits and are therefore not self-decodable at the UE. Therefore, if the base station divides the code block associated with the selected RV 0 into a number of segments, and the UE reports in CSI one of those segments as being low quality (for example, a segment which includes the RV 0 starting bit), the base station may optimally select a new RV whose starting bit overlaps most closely with the low quality segment. For instance, the base station may select RV 3 for the next re-transmission, since that RV may overlap more closely with the low quality segment of RV 0 than, for example, RV 1 or RV 2. As a result, such optimal RV selection allows the base station to retransmit mostly the low quality bits of a code block, rather than inefficiently retransmitting a significant amount of high quality bits with a different RV. Additionally, while the aforementioned example refers to four configured RVs, in other examples, more than four RVs may be configured, resulting in more flexible starting bit choices for code block retransmission (and thus allowing the base station to select a more optimal RV to avoid inefficient retransmission of high quality bits). Therefore, by reporting individual code block segment qualities in CSI, the UE may effectively recommend a HARQ RV sequence for the base station to apply in its retransmissions, thus improving retransmission performance.

Figure 5:
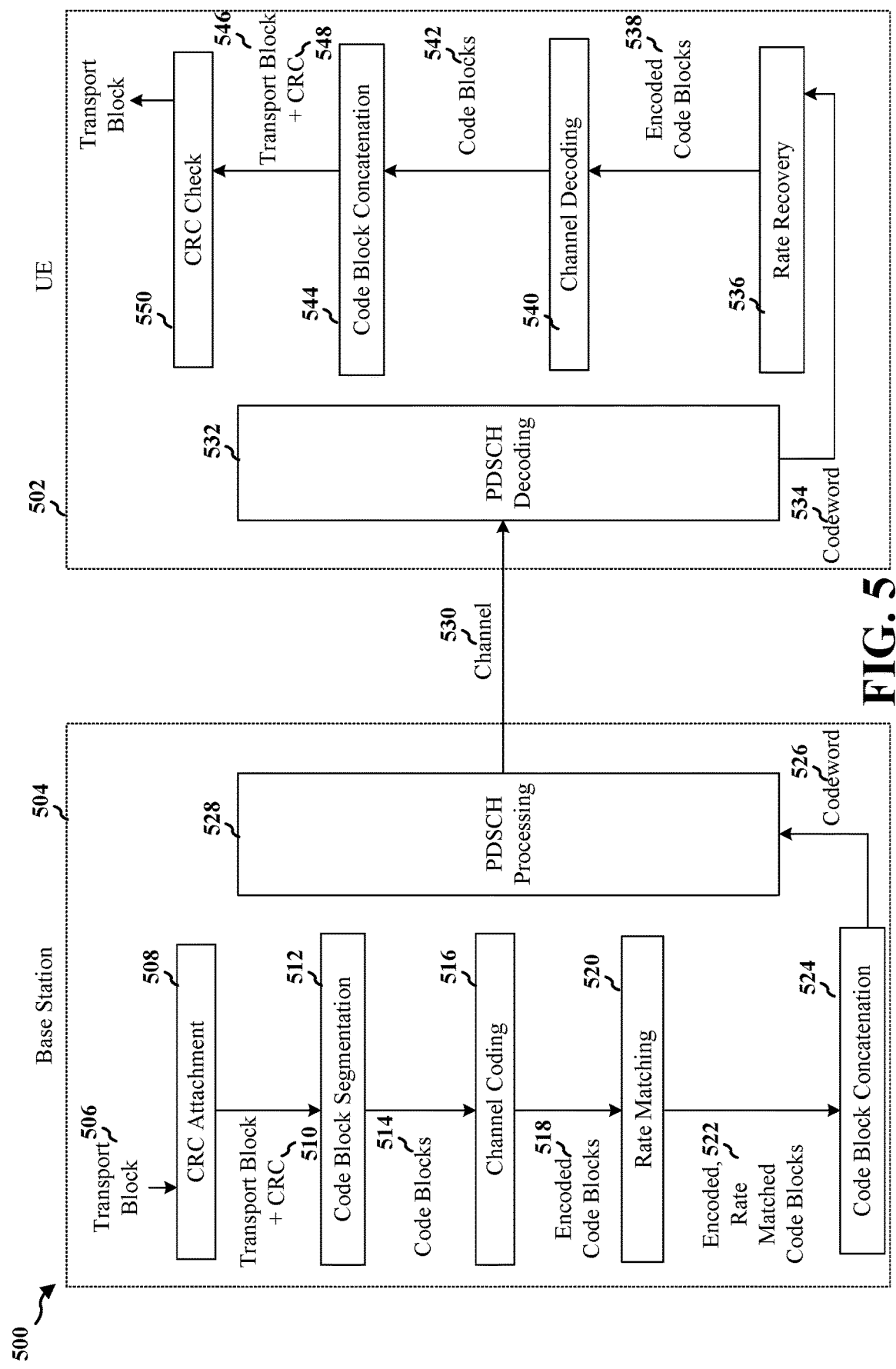
FIG. 5 is a diagram illustrating an example downlink data processing flow in which a UE receives one or more code blocks from a base station.

FIG. 5 illustrates an example 500 of a downlink data processing flow in which a UE 502 receives one or more code blocks from a base station 504. Initially, the base station generates a transport block 506 including data to be sent to the UE. At block 508, the base station attaches a cyclic-redundancy check (CRC) 510 to the transport block, which is computed from the input bits of the transport block. Next, at block 512, the base station may segment the transport block with appended CRC into code blocks 514. Each code block may be sized to no larger than a maximum configured code block size (e.g., 3840 bits or 8448 bits depending on a base graph applied), and an additional CRC sequence may be attached to each of the code blocks. Alternatively, if the transport block with appended CRC is itself no larger than the maximum configured code block size, then the base station may not perform code block segmentation. In such case, the transport block may itself be processed as a single code block, or stated another way, the length of the code block equals the length of the transport block (i.e., the length of the transport block here is the total length of transport block 506 and CRC 510). The base station may also add parity bits and insert filler bits to each code block (or the single code block). Then, at block 516, the base station 504 applies channel coding to the code block(s) 514. For instance, the base station may include a LDPC encoder, which encodes the code blocks using the applied base graph and a parity check matrix to form encoded code blocks 518. The encoded code blocks may include systematic bits (the information bits of the code block) and parity bits.

Next, at block 520, the base station 504 applies rate matching to the encoded code blocks. For instance, the base station may match each of the encoded code blocks to a given code rate (e.g., a code rate indicated by a MCS) associated with a CQI reported by the UE in a CSI report. During rate matching of a code block, the base station stores the bits of the encoded code block in a circular buffer (which size may depend on the base graph applied), and reads from the circular buffer a number of bits based on an amount of available resource elements or resource blocks for the transmission. The base station also selects an RV index (e.g., RV 0, 1, 2, or 3), which indicates a starting bit of the circular buffer from which the base station reads the bits. The base station may also interleave the filler bits in the circular buffer with the previously read bits. After thus obtaining the rate matched code block, the base station repeats the above process for the other encoded code blocks. Thus, the base station may form encoded, rate matched code blocks 522.

Once the code block(s) 514 have been encoded and rate matched, at block 524, the base station 504 concatenates the encoded and rate matched code blocks into a codeword 526, and the base station applies PDSCH processing at block 528 to the codeword. For instance, the base station may scramble the codeword, modulate the scrambled codeword into modulated symbols, map the modulated symbols onto one or more layers, apply precoding to the layer-mapped and modulated symbols, and map the precoded symbols to resource elements. The base station may then transmit the codeword in the resource elements over wireless channel 530 to the UE 502 (e.g., using one or more antennas 320 in FIG. 3).

Upon receiving the data from the base station (e.g., using one or more antennas 352 in FIG. 3), the UE may apply PDSCH decoding at block 532, including de-precoding, layer de-mapping, demodulation and descrambling, in order to obtain codeword 534. Afterwards, at block 536, the UE 502 may perform rate recovery. For instance, the UE may perform inverse operations to those applied by the base station during rate matching (e.g., code block concatenation, bit interleaving, bit selection based on an RV index), in response to which the UE may obtain encoded code block(s) 538. After performing rate recovery, the UE may obtain a vector of LLRs, with each LLR corresponding to one of the bits of one of the encoded code block(s). The UE may obtain a vector of LLRs for each encoded code block.

The UE 502 may then, at block 540, perform channel decoding of the encoded code block(s). For instance, the UE may include an LDPC decoder which receives the aforementioned vector of LLRs for an encoded code block as input (i.e., the input LLR vector) and which decodes the input LLR vector through one or more iterations of belief propagation decoding until a new vector of LLRs representing the LDPC-decoded code block (i.e., the output LLR vector corresponding to the decoded code block) is obtained. The UE may repeat the aforementioned process using the LDPC decoder to decode other encoded code blocks, resulting in code block(s) 542.

Upon obtaining code block(s) 542, at block 544, the UE 502 may concatenate the code blocks to obtain a transport block 546 with appended CRC 548. In the case where a single code block is received (e.g., the code block has a length equal to the length of the transport block and appended CRC), the UE may skip code block concatenation. Afterwards, at block 550, the UE may perform a CRC check.

For instance, the UE may compute a CRC from the bits of the transport block 546 and compare the computed CRC with the appended CRC 548. If the computed CRC matches the appended CRC, the UE may determine that the CRC check is successful and conclude that the transport block 546 is successfully decoded. Otherwise, if the computed CRC does not match the appended CRC, the UE may determine that a decoding failure has occurred. Similarly, prior to concatenating the code blocks at block 544, the UE may perform CRC checks of the additional CRC sequences attached to each code block, and the UE may determine whether a code block was successfully or unsuccessfully decoded based on the result of the corresponding CRC check.

Figure 6:
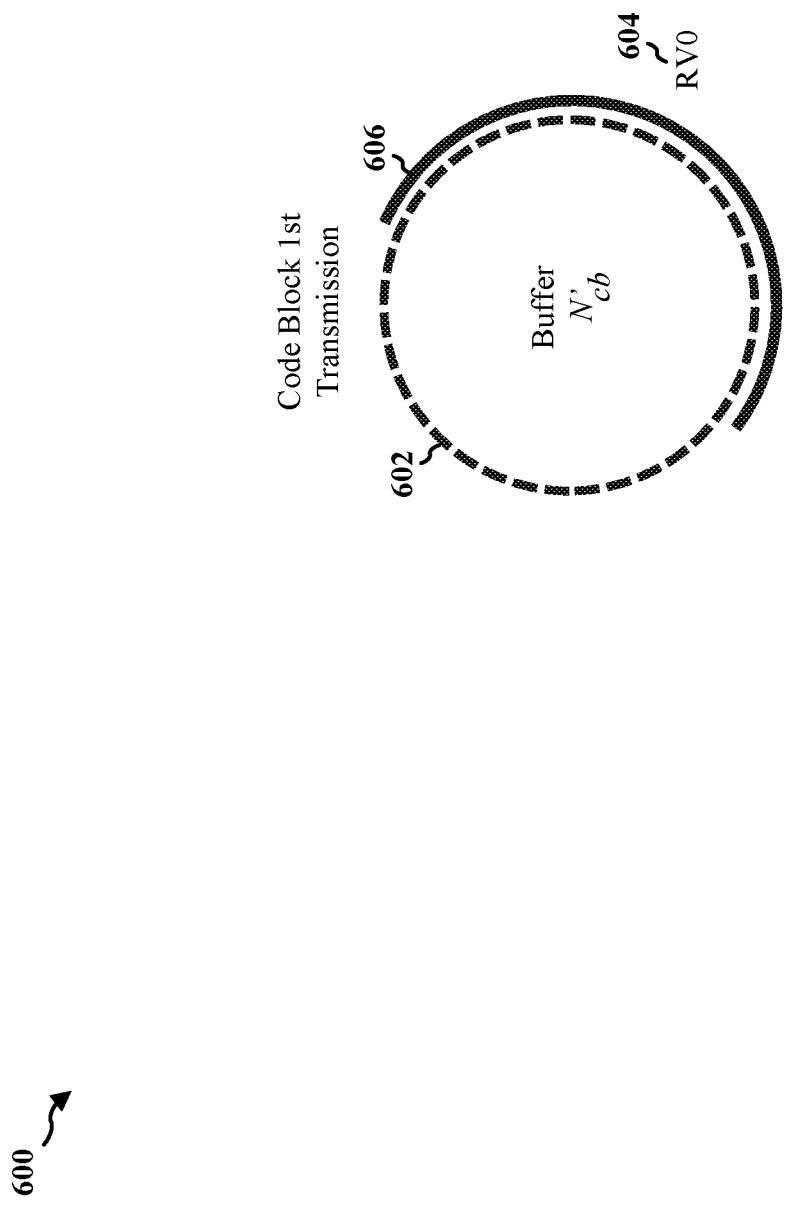
FIG. 6 is a diagram illustrating an example of a circular buffer in which the base station may store a code block during rate matching.

FIG. 6 illustrates an example 600 of a circular buffer 602 in which the base station may store a code block (e.g., $N'_{cb}$ bits of an encoded code block) during rate matching (e.g., at block 520 in FIG. 5). During rate matching, the base station may select an RV index 604 from which to begin reading bits of the circular buffer to form rate matched blocks. For instance, in the illustrated example, the base station may select RV 0 for a first PDSCH transmission, and read a number of bits 606 from the circular buffer 602 beginning from the starting bit associated with RV 0 (e.g., in a clockwise direction in the example of FIG. 6). The base station may then transmit the rate matched code block to the UE (e.g., in codeword 526). If the UE fails to decode the code block due to a portion of the code block having low LLR quality (e.g., from conditions of wireless channel 530), the UE may report a non-acknowledgment of the code block to the base station in CSI, in response to which the base station may re-transmit the code block with a different RV. However, since the base station may not be able to determine which portion of the code block had low LLR quality from the non-acknowledgment alone, the base station may select a sub-optimal RV resulting in inefficient retransmission of a significant number of high LLR quality bits.

Figure 7:
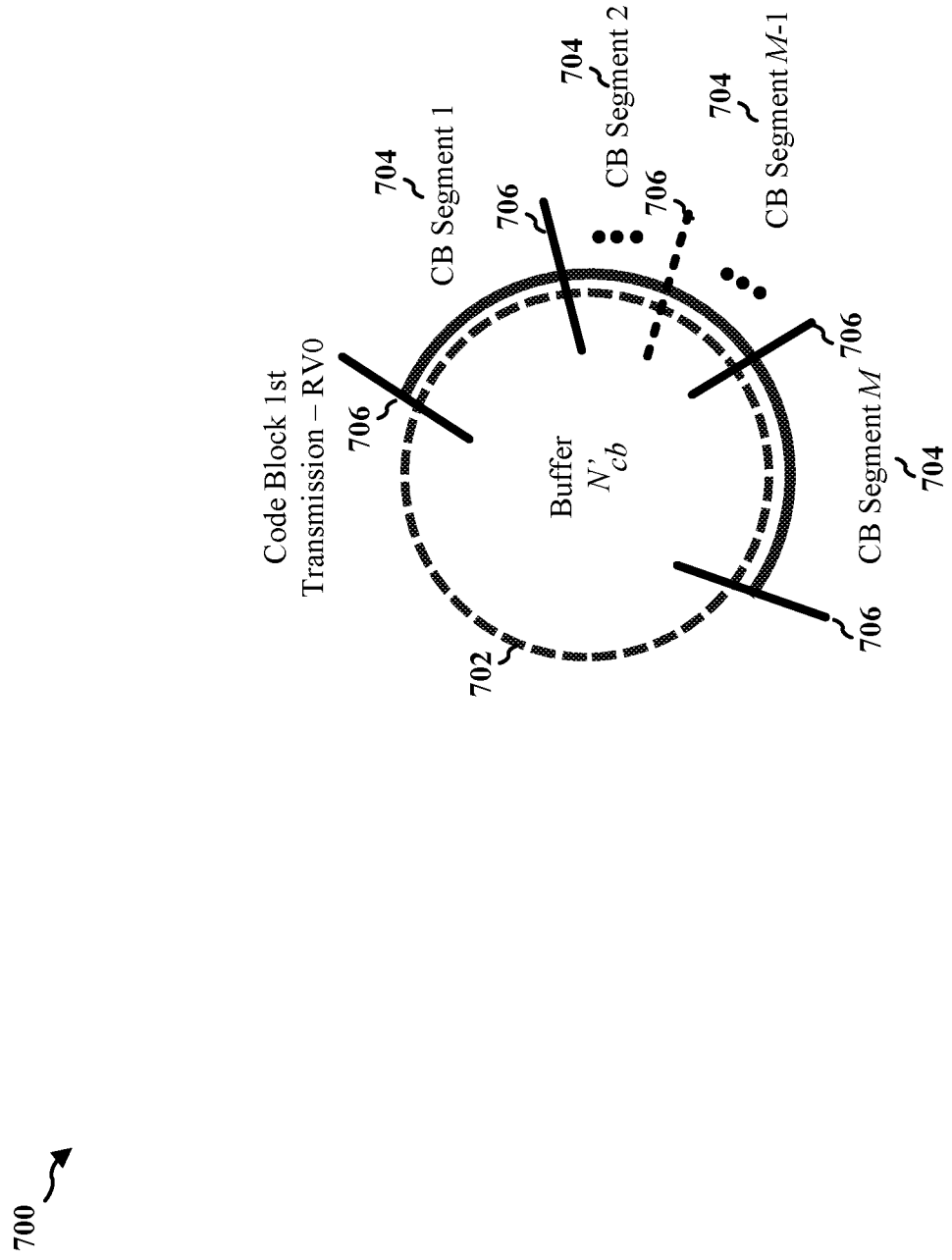
FIG. 7 is a diagram illustrating the example circular buffer of FIG. 6 where the base station divides the code block stored in the buffer into a plurality of code block segments.

To address this inefficiency, the base station may segment the encoded code block during rate matching into multiple parts. For instance, FIG. 7 illustrates an example 700 of a circular buffer 702 in which the base station stores and reads bits of an encoded code block during rate matching similar to the example of FIG. 6, but where the base station divides the bits into a plurality of code block segments 704. For example, the base station may split the code block into M code block segments, where M is configured by the base station in an RRC configuration or medium access control (MAC) control element (MAC-CE). Each of the code block segments 704 may be uniform in length or non-uniform in length (e.g., in number of bits). If the code block segments are uniform in length, the UE may determine boundaries 706 for each code block segment simply based on the configured value of M For instance, if the encoded code block in the circular buffer includes 1000 bits, and M is configured to be 4, the segments may each be 250 bits in length. Alternatively, if the code block segments are non-uniform in length, the base station may indicate the boundaries 706, for example, by providing the starting and ending bit (or length) of each segment. The length of each segment may also depend on the size of the circular buffer 702 (e.g., segments may be longer for one applied base graph and shorter for another applied base graph). The base station may indicate the non-uniform boundaries to the UE in an RRC configuration or MAC-CE.

Figure 8:
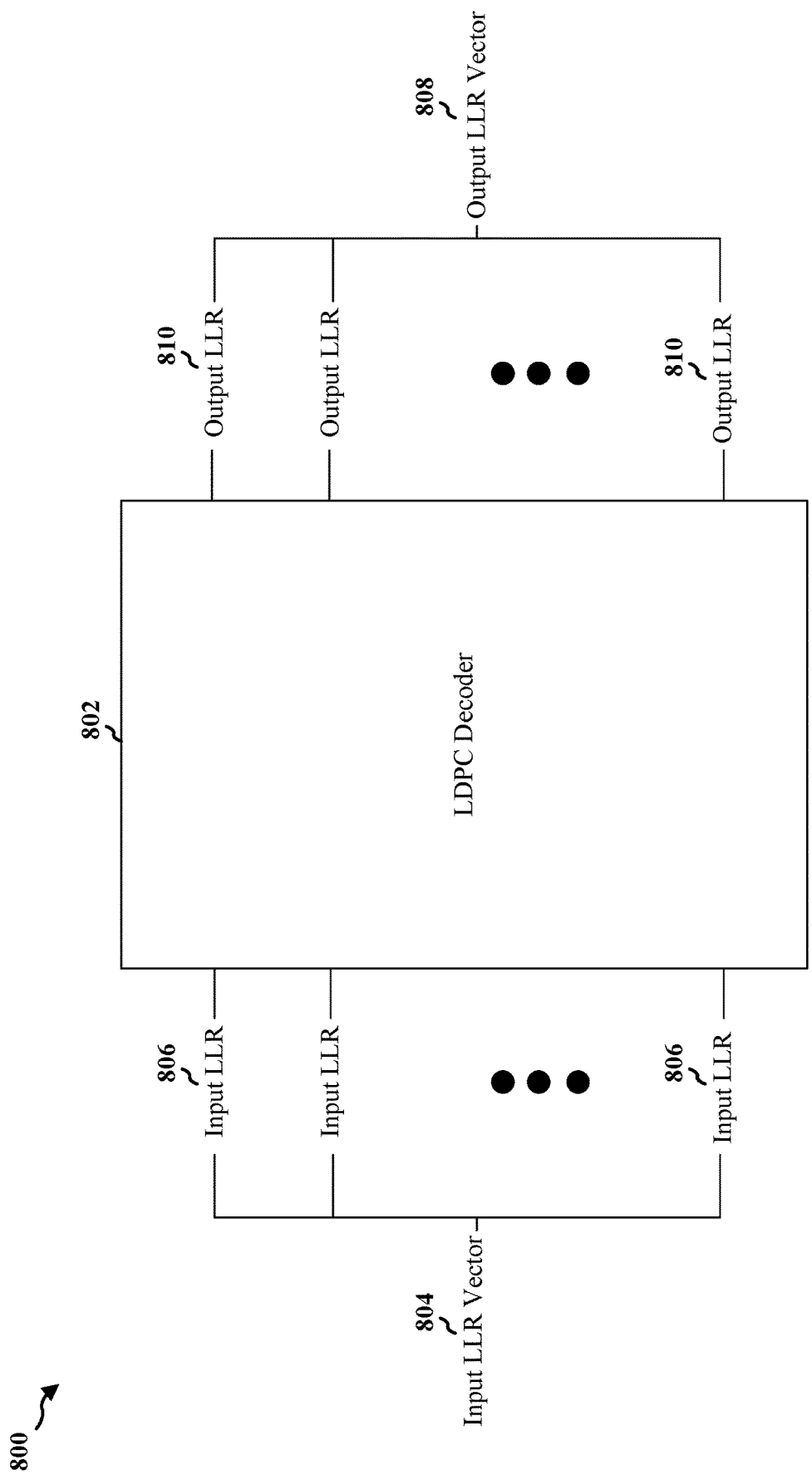
FIG. 8 is a diagram illustrating an example of a low density parity check (LDPC) decoder which the UE may operate during channel decoding.

After the base station segments the encoded code block such as described above in FIG. 7, the base station may transmit the encoded and rate matched code block to the UE (e.g., in codeword 526). In response to receiving the encoded and rate matched code block (e.g., in codeword 534), the UE may identify the code block segments (e.g., based on the configured value of M and boundary starting bits and lengths), and the UE may apply channel decoding to each of the code block segments. For instance, FIG. 8 illustrates an example 800 of a LDPC decoder 802 at the UE which may operate during channel decoding (e.g., at block 540 of FIG. 5). In this example, the LDPC decoder 802 may receive an input LLR vector 804 of input LLRs 806 corresponding to bits of an encoded code block segment, decode the input LLR vector through one or more iterations of belief propagation decoding, and obtain an output LLR vector 808 of output LLRs 810 corresponding to bits of a decoded code block segment. The length or size of the input LLR vector and the output LLR vector may be the same (e.g., each including a same number of LLRs corresponding to systematic and parity bits). For each encoded code block segment, the LDPC decoder 802 may receive and decode an input LLR vector and obtain an output LLR vector, and the UE may afterwards combine the decoded code block segments (e.g., the output LLR vectors) into a decoded code block. The UE may repeat the above process for the code block segments of other code blocks, thereby resulting in code block(s) 542.

The UE may determine a quality of a code block segment based on the input LLR vector 804 for the segment, the output LLR vector 808 for the segment, or both the input and output LLR vectors for the segment. For instance, for each code block segment, the UE may calculate an agreed metric between the base station and the UE which is a function of the input LLR vector, output LLR vector, or both LLR vectors, and the UE may compare that metric with a configured threshold Z. If the metric is less than the threshold Z, the UE may determine that the code block segment has low quality (e.g., low LLR quality or energy), while if the metric is greater than or equal to the threshold, the UE may determine that the code block segment has high quality (e.g., high LLR quality or energy). Thus, the UE may determine which segment(s) of a code block have low quality and thus should be repeated or re-transmitted, and the UE may report at least these segment(s) to the base station in a CSI report. Moreover, based on the CSI report, the base station may determine which code block segment(s) are indicated as low quality and accordingly select an optimal RV for a subsequent transmission, thus efficiently repeating or re-transmitting those bits with low LLR quality to the UE.

In various examples, the UE may quantize the metric for the code block segment, for example, as a 0 or 1, and report the quantized metric to the base station in the CSI report. For instance, if the UE determines a code block segment to have low quality, the UE may report a 0 for that segment to the base station, while if the UE determines the code block segment to have high quality, the UE may report a 1 for that segment to the base station. The UE may similarly calculate, quantize and report quantized metrics for other code block segments (e.g., based on other input LLR vectors and/or output LLR vectors). Here, reporting quantized metrics may save resources in the CSI report compared to reporting the metrics themselves, although in some examples, the UE may report a metric itself (un-quantized) in the CSI report.

In one example metric, the base station may configure the UE to calculate a norm of the input LLR vector, a norm of the output LLR vector, or a weighted sum of the norm of the input LLR vector and the norm of the output LLR vector, and the UE may compare the calculated norm or weighted sum (the agreed metric in this example) with the configured threshold Z to determine the quality of the code block segment. In one example, the norm may be represented by the function $\|\vec{u}\|$ in Equation 1, where $\vec{u}$ represents the LLR vector (e.g., the input or output vector) and $u_n$ is an nth element of the vector $\vec{u}$ (e.g., the nth LLR in the vector, corresponding to one of the bits of the encoded code block segment):

$$\|\vec{u}\| = \sqrt{u_1^2 + u_2^2 + \ldots + u_n^2} \qquad (1)$$

In another example metric, the weighted sum of the input LLR vector norm and the output LLR vector norm may be represented by the function w in Equation 2, where $\|\vec{x}\|$ represents the norm of the input LLR vector, $\|\vec{y}\|$ represents the norm of the output LLR vector, and a represents the weight coefficient:

$$w = a\|\vec{x}\| + (1-a)\|\vec{y}\| \qquad (2)$$

Once the UE calculates the metric $\|\vec{u}\|$ or w, the UE may compare the metric with the configured threshold Z, and determine code block segment quality accordingly. For instance, if the base station configures the threshold Z as 3 (or some other number), then the UE may determine that the code block segment has low quality when $\|\vec{u}\| < Z = 3$ or if $w < Z = 3$, while the UE may determine that the code block segment has high quality when $\|\vec{u}\| \geq Z = 3$ or if $w \geq Z = 3$. Alternatively, the base station may configure a different function than the norm or weighted sum of the norms for determining code block segment quality, and the UE may determine code block segment quality based on the different function by comparing that metric with the configured threshold Z accordingly. After the UE determines if the code block segment is low quality or high quality, the UE may quantize the result (e.g., as a 0 or 1), and report the quantized result to the base station in CSI for that segment.

In a further example metric, the base station may configure the UE to calculate a number of LLRs of the input LLR vector or the output LLR vector which exceeds a count threshold z (i.e., a number of threshold-exceeding LLRs), or a weighted sum of the number of threshold-exceeding LLRs of the input LLR vector and of the output LLR vector, and the UE may compare the calculated number or weighted sum (the agreed metric in this example) with the configured threshold Z (which is a different threshold than count threshold z), to determine the quality of the code block segment. In one example, the number of threshold-exceeding LLRs may be represented by the function N in Equation 3, where $\vec{u}$ represents the LLR vector (e.g., the input or output vector), $u_i$ is an ith element of the vector $\vec{u}$ (e.g., the ith LLR in the vector, corresponding to one of the bits of the encoded code block segment), n is the number of elements in the vector $\vec{u}$, and z is the count threshold:

$$N = \Sigma_{i=0}^{n}[|u_i| > z], u_i \in \vec{u} \qquad (3)$$

As an example, assume the input LLR vector 804 received for a code block segment is [0.1, 0.4, −1, −4, −5, 10], and the count threshold z is 1. In such case, the UE may calculate N by taking the absolute value of each element of the vector, comparing each absolute-valued element with the count threshold z, and counting the number of absolute-valued elements which exceed the count threshold z, resulting in the UE determining N=3. The UE may similarly calculate a different N (or in some cases a same N) for output LLR vector 808. In an additional example metric, the weighted sum of N for the input LLR vector and of N for the output LLR vector may be represented by the function W in Equation 4, where $N_x$ represents a number of LLRs calculated in Equation 3 for the input LLR vector, $N_y$ represents a number of LLRs calculated in Equation 3 for the output LLR vector, and a represents the weight coefficient:

$$W = aN_x + (1-a)N_y \qquad (4)$$

Once the UE calculates the metric N or W, the UE may compare the metric with the configured threshold Z and determine code block segment quality accordingly. For instance, if the base station configures the threshold Z as 2 (or some other number), then the UE may determine that the code block segment has low quality when $N < Z = 2$ or if $W < Z = 2$, while the UE may determine that the code block segment has high quality when $N \geq Z = 2$ or if $W \geq Z = 2$. Thus, in the example above where N=3, the UE may determine the code block segment to have high quality. Alternatively, the base station may configure a different function than the number of threshold-exceeding LLRs or the weighted sum of such numbers for determining code block segment quality, and the UE may determine code block segment quality based on the different function by comparing that metric with the configured threshold Z accordingly. After the UE determines if the code block segment is low quality or high quality, the UE may quantize the result (e.g., as a 0 or 1), and report the quantized result to the base station in CSI for that segment.

While the above examples refer to the UE determining and quantizing code block segment quality based on a single threshold, in other examples, the UE may determine and quantize code block segment quality based on multiple thresholds. For instance, referring to any of Equations (1), (2), (3), or (4) above, instead of simply comparing the metric $\|\vec{u}\|$, w, N, or W to a single threshold Z (e.g., 3 or some other number) and quantizing the metric into a single bit (0 or 1) accordingly for CSI reporting, the UE may compare the metric to multiple thresholds $Z_a$, $Z_b$, etc., and the UE may quantize the metric for CSI reporting into multiple bits based on the result of the threshold comparisons. For example, the base station may configure four thresholds $Z_a$, $Z_b$, $Z_c$, $Z_d$, and the UE may compare calculated metric F (e.g., $\|\vec{u}\|$, w, N, or W, or some other metric) with each threshold and quantize the result accordingly into two bits such that if $0 \leq F < Z_a$, the UE may quantize F as 00, if $Z_a \leq F < Z_b$, the UE may quantize F as 01, if $Z_b \leq F < Z_c$, the UE may quantize F as 10, and if $Z_c \leq F < Z_d$ the UE may quantize F as 11. In other examples, the base station may configure other numbers of thresholds and quantize the result into other numbers of bits. By providing multiple thresholds for metric comparison and quantization, the UE may report additional, soft information regarding the quality of the code block segment, for instance, a degree of code block segment quality, rather than a merely binary representation of whether the code block segment is high or low quality. For example, a quantized F of 00 may indicate a code block segment is very low quality, 01 may indicate a code block segment is relatively low quality, 10 may indicate a code block segment is relatively high quality, and 11 may indicate a code block segment is very high quality.

Moreover, while in some examples, the metric F may be an output of a pre-configured function (e.g., either $\|\vec{u}\|$, w, N, or W, or some other metric), in other examples, the base station may select one of multiple configured functions from which the UE may calculate F. For instance, the base station may provide a RRC configuration or a MAC-CE indicating whether the UE is to calculate the metric for a code block segment based on an input LLR vector norm, an output LLR vector norm, a weighted sum of an input LLR vector norm and output LLR vector norm, a number of threshold-exceeding LLRs for an input LLR vector, a number of threshold-exceeding LLRs for an output LLR vector, a weighted sum of the number of threshold-exceeding LLRs for both the input LLR vector and the output LLR vector, or some other configured function. For example, the base station may include one or more bits in the RRC configuration or MAC-CE indicating whether the UE is to apply Equations (1), (2), (3), or (4) above for determining and reporting quality of a code block segment.

In one example, after the UE determines the quality of all M code block segments for an encoded code block (e.g., encoded code block 538) based on the input LLR vector 804 and/or the output LLR vector 808 for each code block segment 704, the UE may quantize and report the quality of each of the M code block segments in a bitmap. For instance, if the UE determines and quantizes each code block segment quality into a single bit $Q$ (i.e., $Q=1$) based on a single threshold comparison as described above, the UE may report M bits for each code block (one bit for each code block segment) in the bitmap to the base station. As an example, referring to FIG. 7, if M=4 for a given code block and the UE determines and quantizes the first segment as 0 (low quality), the second segment as 1 (high quality), the third segment as 0 (low quality), and the fourth segment as 1 (high quality), the UE may report the following four-bit bitmap to the base station for that code block: 0101. In another example, if the UE determines and quantizes each code block segment quality into multiple bits $Q$ (e.g., with soft information) based on a multiple threshold comparison as described above, the UE may report M*$Q$ bits in the bitmap to the base station, where $Q$ represents the number of quantization bits per code block segment. As an example, referring again to FIG. 7, if M=4 and $Q=2$ for a given code block and the UE determines and quantizes the first segment as 00 (very low quality), the second segment as 11 (very high quality), the third segment as 01 (relatively low quality), and the fourth segment as 10 (relatively high quality), the UE may report the following eight-bit bitmap to the base station for that code block: 00110110. The base station may configure the number of quantization bits $Q$ for each code block segment, as well as the number of code block segments M for each code block, in an RRC configuration or MAC-CE. The UE may similarly report a bitmap of M*$Q$ bits for each code block indicating the quality of each code block segment in the CSI report.

In another example, rather than reporting the quality of each of the M code block segments in a bitmap, the UE may report the indices of K worst segments of the M code block segments. The UE may determine the value of K from an RRC configuration or MAC-CE provided by the base station. The K worst code block segments may be those code block segments for which the UE determines the lowest quality among the M code block segment qualities (e.g., based on any of the example functions described above or from a different metric). For example, if M=4, $Q=1$, and K=2 for a given code block, and the UE determines and quantizes the first segment as 0 (low quality), the second segment as 1 (high quality), the third segment as 0 (low quality), and the fourth segment as 1 (high quality) such as described in the example above, the UE may provide the indices of only the first segment and the third segment in the CSI report (e.g., segment index 1 and segment index 3) since these K=2 segments include the worst code block segment qualities (low quality) of all M=4 segments.

If the UE determines code block segment quality based on a single threshold which is quantized into a single bit (e.g., $Q=1$), such as in the above example, the UE may indicate the qualities of the K worst code block segments through reporting of their corresponding indices. For instance, the UE may indicate a code block segment is low quality simply by including that segment's index in the CSI report. Alternatively, if the UE determines code block segment quality based on multiple thresholds which is quantized into at least two bits (e.g., $Q \geq 2$), the UE may directly report the quality of the K worst code block segments as soft information, as well as the index. For example, if M=4, $Q=2$, and K=2 for a given code block and the UE determines and quantizes the first segment as 00 (very low quality), the second segment as 11 (very high quality), the third segment as 01 (relatively low quality), and the fourth segment as 10 (relatively high quality) such as described above, the UE may provide the indices as well as the qualities of the first segment and the third segment in the CSI report (e.g., quality 00 for segment 1 and quality 01 for segment 3) since these K=2 segments include the worst code block segment qualities of all M=4 segments.

Additionally, in the event where more than K code block segments include a lowest quality, the UE may select K of these segments, for example, in order of segment index. For instance, in the $Q=1$ example above, if the quality of the fourth segment was 0 (rather than 1), the UE may report the first segment (e.g., segment index 1—quality 0) and either the third or fourth segment based on whether ascending or descending index order takes priority (e.g., segment index 3—quality 0 if ascending, or segment index 4—quality 0 if descending). Similarly, in the $Q=2$ example above, if the quality of the fourth segment was 01 (rather than 10), the UE may report the first segment (e.g., segment index 1—quality 00) and either the third or fourth segment based on whether ascending or descending index order takes priority (e.g., segment index 3—quality 01 if ascending, or segment index 4—quality 01 if descending).

Figure 9:
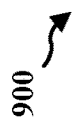
FIG. 9 is a diagram illustrating an example of a channel state information (CSI) report which the UE sends to the base station for non-acknowledged code blocks in which the UE reports K worst code block segments for each code block.

FIG. 9 illustrates an example 900 of a CSI report in which the UE may report the K worst code block segments for each non-acknowledged code block of the code blocks (e.g., code blocks 542 or encoded code blocks 538 of FIG. 5) that the UE receives from the base station. For example, if the UE fails to decode a code block due to low LLR quality, e.g., by identifying a mismatch between an appended CRC and a computed CRC during a CRC check, the UE may determine to provide a NACK for that code block which the UE has failed to decode (not shown), and a CSI report including an index 902 of the non-acknowledged code block, an index or indices 904 of the K worst code block segments for the non-acknowledged code block, and if the non-acknowledged code block has code block segment qualities quantized into multiple bits (e.g., $Q \geq 2$), code block segment qualities 906 (e.g., soft information) of the K worst code block segments for that code block. The UE may similarly provide a NACK for other code blocks which the UE has failed to decode, and include in the CSI report the index 902 of each non-acknowledged code block, the index or indices 904 of the K worst code block segments for each non-acknowledged code block, and the code block segment qualities 906 of the K worst code block segments for each non-acknowledged code block where $Q \geq 2$.

For example, in response to receiving code blocks configured with M=4, K=2, and $Q=1$, the UE may report the index 902 of the first non-acknowledged code block (e.g., code block index 1), followed by the indices 904 of the code block segments having the worst segment quality for code block index 1 (e.g., segment index 1 and segment index 3), followed by the index 902 of the second non-acknowledged code block (e.g., code block index 2), followed by the indices 904 of the code block segments having the worst segment quality for code block index 2 (e.g., segment index 1 and segment index 4), and so forth for each non-acknowledged code block. In another example, in response to receiving code blocks configured with M=4, K=2, and Q =2, the UE may report the index 902 of the first non-acknowledged code block (e.g., code block index 1), followed by the indices 904 of the code block segments having the worst segment quality for code block index 1 (e.g., segment index 1 and segment index 3), followed by the qualities 906 of the indicated code block segments in indices 904 for code block index 1 (e.g., quality 00 for segment index 1, quality 01 for segment index 3), followed by the index 902 of the second non-acknowledged code block (e.g., code block index 2), followed by the indices 904 of the code block segments having the worst segment quality for code block index 2 (e.g., segment index 1 and segment index 4), followed by the qualities 906 of the indicated code block segments in indices 904 for code block index 2 (e.g., quality 01 for segment index 1, quality 01 for segment index 4), and so forth for each non-acknowledged code block. Thus, the base station may determine the non-acknowledged code blocks, code block segments for those code blocks, and the quantized (multiple bit) segment qualities for those segments from the CSI report.

After the base station receives a CSI report indicating a code block segment quality of a non-acknowledged code block (such as the CSI report in example 900), the base station may schedule a code block retransmission in DCI based on the indicated code block segment quality. In one example, the DCI may include an RV index for the code block retransmission. For instance, the base station may configure DCI to include a different RV index than the RV index associated with the non-acknowledged code block. The different RV index may be associated with a different starting bit and ending bit (or bit length) in the circular buffer 602, 702 than those of the RV index associated with the prior code block which encompasses the low quality code block segment(s). For example, referring to FIG. 7, if the base station divided a prior code block associated with RV 0 into segments 704, and the UE reports in CSI one of those segments as being low quality (for example, CB segment 1), the base station may select RV 3 as a new RV index whose starting bit overlaps most closely with the low quality segment, and indicate that RV index in the DCI scheduling the code block retransmission.

Alternatively, in another example, the DCI may include a starting bit and length (e.g., number of bits) for the code block retransmission. For instance, rather than expressly including an RV index in the DCI for the code block re-transmission, which impliedly indicates a starting bit and bit length associated with the indicated RV index in the circular buffer 602, 702, in this example the base station may expressly indicate the starting bit and bit length themselves in the DCI. Thus, the base station may indicate a different starting bit or bit length in DCI than those associated with the RV indices (e.g., RV 0-3). Alternatively, in another example, the DCI may include the starting bit and an ending bit for the code block retransmission rather than the length (e.g., number of bits). For instance, in this example, the base station may expressly indicate in the DCI scheduling the code block retransmission the starting bit and ending bit in the circular buffer 602, 702. Thus, the base station may indicate a different ending bit in DCI than those associated with the various RV indices (e.g., RV 0-3).

Alternatively, in another example, the DCI may include a resource element allocation for the code block retransmission, where the resource element allocation indicates the starting bit and ending bit. For instance, each time domain resource allocation (TDRA) and/or frequency domain resource allocation (FDRA) which the base station may configure in DCI may be associated with a different starting bit and ending bit (or bit length) in the circular buffer 602, 702 for the code block re-transmission, and thus the base station may impliedly indicate the respective starting bit, ending bit, and/or bit length in the DCI through the TDRA and/or FDRA. Thus, the resource element allocation may allow the base station to indicate additional starting bits, ending bits, or bit lengths in DCI than those associated with the four typically configurable RV indices (e.g., RV 0-3).

Alternatively, in a further example, the DCI may include an RV index for the code block retransmission as previously described, but also include an offset for the starting bit associated with the included RV index. The offset may in unit of number of bits relative to the starting bit of the indicated RV index. For example, if the base station indicates RV index 3 in the DCI for the code block retransmission with a small, starting bit offset, the starting bit and ending bit in the circular buffer 602, 702 may line up between the corresponding bits of RV indices 3 and 0. Thus, the offset may allow the base station to indicate additional starting bits or ending bits in DCI than those associated with the four typically configurable RV indices (e.g., RV 0-3).

Figure 10:
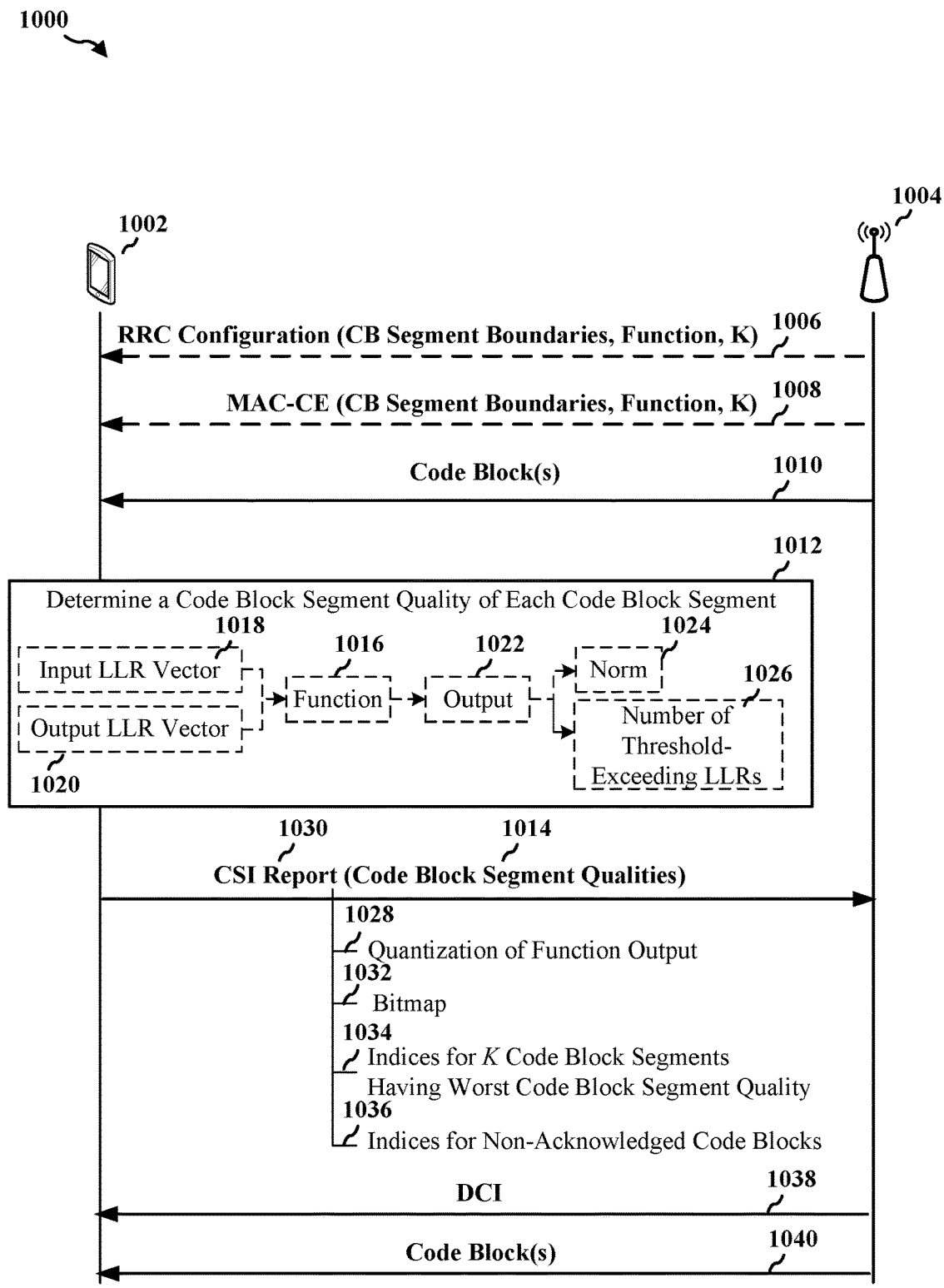
FIG. 10 is a call flow diagram between a UE and a base station.

FIG. 10 illustrates an example 1000 of a call flow diagram between a UE 1002 and a base station 1004. Initially, the UE may receive a RRC configuration 1006 or a MAC-CE 1008 from the base station configuring various parameters related to the code block segments. For example, the RRC configuration or MAC-CE may indicate the number of code block segments (e.g., the number M of code block segments 704), the code block segment boundaries for non-uniform code block segments (e.g., boundaries 706), the configured function by which the UE may determine code block segment qualities (e.g., the function F given by any one of Equations 1, 2, 3, or 4 above or some other function of an input LLR vector and/or an output LLR vector), a number of worst code block segment qualities to report if configured (e.g., the number K), and the number of bits for quantizing code block segment quality (e.g., the number $Q$).

Afterwards, the UE 1002 may receive one or more code blocks 1010 from the base station 1004. For instance, referring to FIG. 5, the UE may receive code blocks 542 (or encoded code blocks 538) from the base station. In response to receiving the code block(s), at block 1012, the UE may determine a code block segment quality 1014 of each code block segment. For instance, referring to FIGS. 7-9, the UE may determine the quality (for example, quality 906) of each code block segment 704 based on a function 1016 (e.g., the function F indicated in RRC configuration 1006 or MAC-CE 1008) of an input LLR vector 1018 and/or output LLR vector 1020. For example, an output 1022 of the function 1016 may be a norm 1024 of the input LLR vector and/or output LLR vector, a number of threshold-exceeding LLRs 1026 in the input LLR vector and/or output LLR vector, or a different metric. The UE may also determine the code block segment quality in response to comparing the output 1022 with one or more thresholds (e.g., Z for a single threshold, or $Z_a$, $Z_b$, etc. for multiple thresholds). For example, the quality may be a quantization 1028 of the output 1022 of function 1016, which quantization the UE may determine based on the threshold comparison(s) and the configured value $Q$ indicated in RRC configuration 1006 or MAC-CE 1008.

Once the UE 1002 determines the code block segment quality of each code block segment for each code block 1010, the UE may transmit a CSI report 1030 to the base station including the code block segment qualities 1014. In one example, the CSI report may include a bitmap 1032 of length M*$Q$, and the bitmap may include the quantization 1028 for each code block segment of a code block. In another example, the CSI report may include indices 1034 for K code block segments having the worst code block segment quality, as well as indices 1036 for non-acknowledged code blocks (e.g., indices 902) including the K code block segments. Where $Q \geq 2$ is configured for a non-acknowledged code block, the CSI report may also include the quantization 1028 of each of the K code block segments.

After the base station 1004 receives the CSI report 1030 from the UE 1002, the base station 1004 may transmit a DCI 1038 scheduling one or more code blocks 1040 to the UE 1002. The code block(s) 1040 may be retransmissions of the code block(s) 1010 in response to the CSI report 1030. The DCI 1038 may include an RV index for the code block(s) 1040 (e.g., a different RV index than for code block(s) 1010), a starting bit and length for the code block(s) 1040, a starting bit and ending bit for the code block(s) 1040, a resource element allocation indicating the starting bit and ending bit for the code block(s) 1040, or an offset for the starting bit associated with an RV index in the code block(s) 1040.

Figure 11:
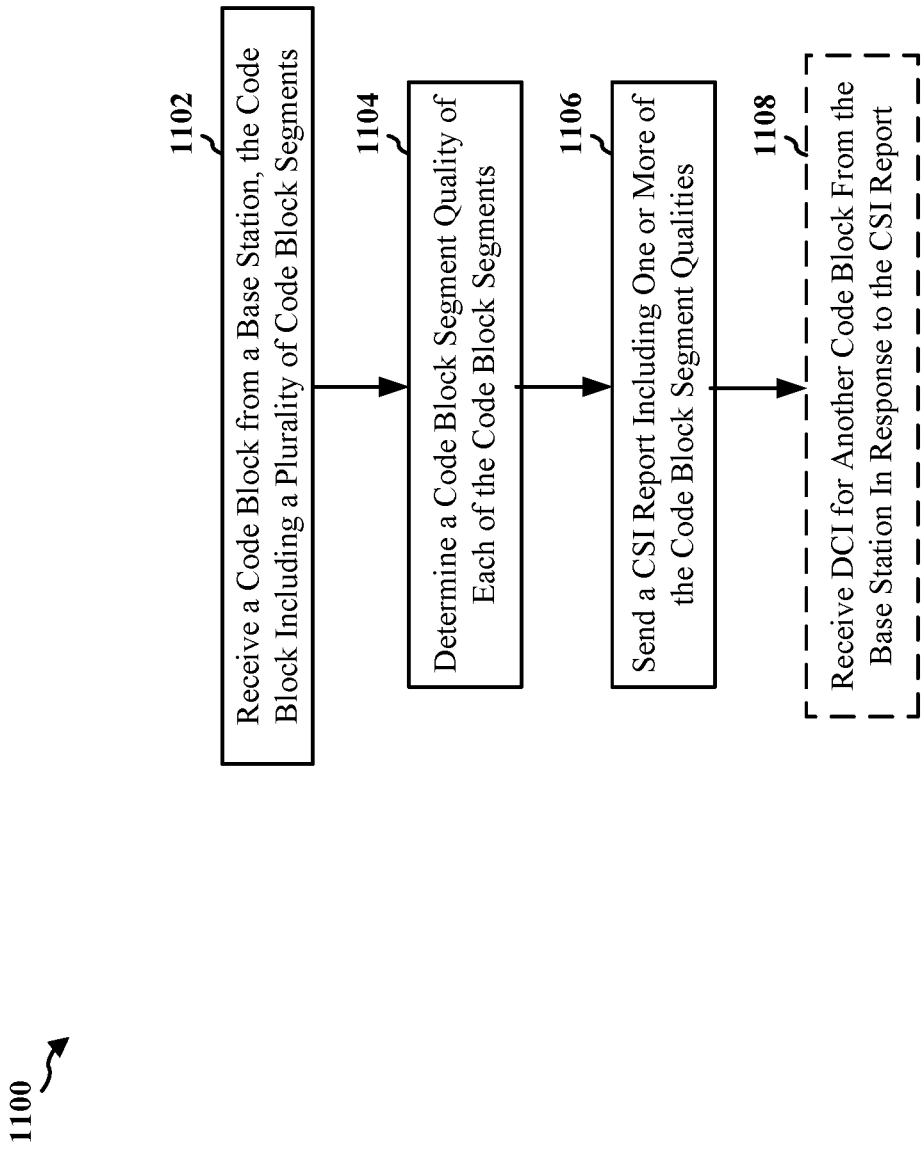
FIG. 11 is a flowchart of a method of wireless communication at a UE.

FIG. 11 is a flowchart 1100 of a method of wireless communication. The method may be performed by a UE (e.g., the UE 104, 350, 502, 1002; the apparatus 1302). Optional aspects are illustrated in dashed lines. The method allows a UE to determine and indicate a quality of individual code block segments of a code block in a CSI report to a base station (e.g., the base station 102/180, 310, 504, 1004). The code block segment qualities allow the base station to determine which segments of the code block are to be re-transmitted, for example, based on a best RV to be applied for the code block retransmission, thereby improving retransmission performance.

At 1102, the UE receives a code block from a base station, the code block including a plurality of code block segments. For example, 1102 may be performed by code block component 1340. For instance, referring to FIGS. 5, 7, and 10, the UE 1002 may receive one or more code blocks 1010 from the base station 1004 (e.g., code blocks 542 or encoded code blocks 538), where each of the code blocks includes multiple code block segments 704.

In one example, the code block segments may include uniform boundaries. For example, referring to FIG. 7, each of the code block segments 704 may be uniform in length (e.g., in number of bits between boundaries 706). If the code block segments are uniform in length, the UE may determine boundaries 706 for each code block segment simply based on the configured value of M. For instance, if the encoded code block in the circular buffer includes 1000 bits, and M is configured to be 4, the segments may each be 250 bits in length.

In one example, the code block segments may include non-uniform boundaries indicated in a RRC configuration or a MAC-CE. For example, referring to FIG. 7, each of the code block segments may be non-uniform in length (e.g., in number of bits between boundaries 706). If the code block segments are non-uniform in length, the base station may indicate the boundaries 706, for example, by providing the starting and ending bit (or length) of each segment. The length of each segment may also depend on the size of the circular buffer 702 (e.g., segments may be longer for one applied base graph and shorter for another applied base graph). Moreover, referring to FIG. 10, the base station 1004 may indicate the non-uniform boundaries to the UE (e.g., the starting and ending bit or length of each code block segment) in the RRC configuration 1006 or MAC-CE 1008.

At 1104, the UE determines a code block segment quality of each of the code block segments. For example, 1104 may be performed by determination component 1342. For instance, referring to FIGS. 7 and 10, at block 1012, the UE 1002 may determine a code block segment quality 1014 of each code block segment 704. For instance, referring to FIGS. 7-9, the UE may determine the quality (for example, quality 906) of each code block segment 704 based on a function 1016 (e.g., the function F indicated in RRC configuration 1006 or MAC-CE 1008) of an input LLR vector 1018 and/or output LLR vector 1020. For example, an output 1022 of the function 1016 may be a norm 1024 of the input LLR vector and/or output LLR vector, a number of threshold-exceeding LLRs 1026 in the input LLR vector and/or output LLR vector, or a different metric. The UE may also determine the code block segment quality in response to comparing the output 1022 with one or more thresholds (e.g., Z for a single threshold, or $Z_a$, $Z_b$, etc. for multiple thresholds). For example, the quality may be a quantization 1028 of the output 1022 of function 1016, which quantization the UE may determine based on the threshold comparison(s) and the configured value $Q$ indicated in RRC configuration 1006 or MAC-CE 1008.

In one example, the code block segment quality of each of the code block segments may be determined based on a function of an input LLR vector to a decoder of the UE, an output LLR vector from the decoder, or the input LLR vector and the output LLR vector. For instance, referring to FIGS. 7, 8, and 10, the UE 1002 may determine the code block segment quality 1014 of each of the code block segments 704 based on the input LLR vector 804 to LDPC decoder 802 for the segment, the output LLR vector 808 from LDPC decoder 802 for the segment, or both the input and output LLR vectors for the segment. For instance, for each code block segment, the UE may calculate an agreed metric between the base station 1004 and the UE which is a function (e.g., function 1016) of the input LLR vector, output LLR vector, or both LLR vectors, and the UE may compare that metric with a configured threshold Z. If the metric is less than the threshold Z, the UE may determine that the code block segment has low quality (e.g., low LLR quality or energy), while if the metric is greater than or equal to the threshold, the UE may determine that the code block segment has high quality (e.g., high LLR quality or energy).

In one example, an output of the function may comprise a norm of the input LLR vector or the output LLR vector. For instance, referring to FIGS. 8 and 10, in one example metric, the base station 1004 may configure the UE 1002 to calculate the norm 1024 of the input LLR vector 804, 1018, the norm 1024 of the output LLR vector 808, 1020, or a weighted sum of the norm of the input LLR vector and the norm of the output LLR vector, as the output 1022 of function F (e.g., function 1016). For instance, the norm may be represented by the function $\|\vec{u}\|$ in Equation 1 above, or the weighted sum of the input LLR vector norm and the output LLR vector norm may be represented by the function w in Equation 2 above. In another example, an output of the function may comprise a number of LLRs exceeding a threshold in the input LLR vector or the output LLR vector. For instance, referring to FIGS. 8 and 10, in a further example metric, the base station 1004 may configure the UE 1002 to calculate a number of LLRs of the input LLR vector or the output LLR vector which exceeds a count threshold z (i.e., the number of threshold-exceeding LLRs 1026), or a weighted sum of the number of threshold-exceeding LLRs 1026 of the input LLR vector and of the output LLR vector, as the output 1022 of function F (e.g., function 1016). For instance, the number of threshold-exceeding LLRs may be represented by the function N in Equation 3 above, or the weighted sum of the number of threshold-exceeding LLRs for the input LLR vector and for the output LLR vector may be represented by the function W in Equation 4 above.

In one example, the code block segment quality may be determined in response to a comparison of an output of the function with a threshold. For example, referring to FIGS. 7 and 10, the UE 1002 may compare the output 1022 of function 1016 (e.g., the norm 1024 or the number of threshold-exceeding LLRs 1026) with the configured threshold Z to determine the quality 1014 of the code block segment 704. For instance, if the base station configures the threshold Z as 3 (or some other number) for comparison with the output of function F in Equation 1 or 2, then the UE may determine that the code block segment has low quality when $\|\vec{u}\| < Z=3$ or if $w<Z=3$, respectively, while the UE may determine that the code block segment has high quality when $\|\vec{u}\| \geq Z=3$ or if $w \geq Z=3$, respectively. Similarly, if the base station configures the threshold Z as 2 (or some other number) for comparison with the output of function F in Equation 3 or 4, then the UE may determine that the code block segment has low quality when $N<Z=2$ or if $W<Z=2$, respectively, while the UE may determine that the code block segment has high quality when $N \geq Z=2$ or if $W \geq Z=2$, respectively. Alternatively, the base station may configure a different function than the norm, the weighted sum of the norms, the number of threshold-exceeding LLRs, or the weighted sum of such numbers for determining code block segment quality, and the UE may determine code block segment quality based on the different function by comparing the output of the different function with the configured threshold Z accordingly.

In one example, the code block segment quality may be determined in response to comparison of an output of the function with multiple thresholds. For instance, referring to FIGS. 7 and 10, instead of simply comparing the output 1022 of function 1016 (e.g., $\|\vec{u}\|$, w, N, or W) to a single threshold Z (e.g., 3 or some other number), the UE 1002 may compare the metric to multiple thresholds $Z_a$, $Z_b$, etc., and determine the quality 1014 of the code block segment 704 accordingly. For example, the base station 1004 may configure four thresholds $Z_a$, $Z_b$, $Z_c$, $Z_d$, and the UE 1002 may compare the output 1022 of function F with each threshold to determine quality as follows: if $0 \leq F < Z_a$, the UE may determine the code block segment is very low quality, if $Z_a \leq F < Z_b$, the UE may determine the code block segment is relatively low quality, if $Z_b \leq F < Z_c$ the UE may determine the code block segment is relatively high quality, and if $Z_c \leq F < Z_d$, the UE may determine the code block segment is very high quality.

In one example, the function may be indicated in a RRC configuration or a MAC-CE. For instance, referring to FIG. 10, the base station 1004 may select one of multiple configurations of function 1016 from which the UE 1002 may calculate output 1022. For instance, the base station may provide RRC configuration 1006 or MAC-CE 1008 indicating whether the UE is to calculate the metric for a code block segment based on an input LLR vector norm, an output LLR vector norm, a weighted sum of an input LLR vector norm and output LLR vector norm, a number of threshold-exceeding LLRs for an input LLR vector, a number of threshold-exceeding LLRs for an output LLR vector, a weighted sum of the number of threshold-exceeding LLRs for both the input LLR vector and the output LLR vector, or some other configured function. For example, the base station may include one or more bits in the RRC configuration or MAC-CE indicating whether the UE is to apply Equations (1), (2), (3), or (4) above for determining and reporting quality of a code block segment.

At 1106, the UE sends a CSI report including one or more of the code block segment qualities. For example, 1106 may be performed by CSI report component 1344. For instance, referring to FIG. 10, the UE 1002 may transmit CSI report 1030 to the base station including one or more of the code block segment qualities 1014 determined at block 1012. In one example, the CSI report may include a bitmap 1032 of length $M*Q$, and the bitmap may include the code block segment quality (in the form of quantization 1028) for each code block segment of a code block. In another example, referring also to FIG. 9, the CSI report may include indices 904, 1034 for K code block segments having the worst code block segment quality, through which indices the code block segment qualities may be indicated (e.g., by their presence in the report). Where $Q \geq 2$ is configured for a non-acknowledged code block, the CSI report may also include the quantization 1028 of each of the K code block segments (e.g., as qualities 906 in the report).

In one example, each of the code block segment qualities in the CSI report may comprise a quantization of an output of the function. For instance, referring to FIG. 10, the UE 1002 may quantize the output 1022 of function 1016 for the code block segment as a 0 or 1, and report this quantization 1028 to the base station in the CSI report 1030. For instance, if the UE determines a code block segment to have low quality at block 1012, the UE may report a 0 for that segment to the base station, while if the UE determines the code block segment to have high quality, the UE may report a 1 for that segment to the base station. In another example, the UE may quantize the output 1022 of function 1016 for the code block segment into multiple bits (e.g., 00, 01, etc.) based on the result of multiple threshold comparisons, and report this quantization 1028 to the base station in the CSI report 1030. For example, a quantized F of 00 may indicate a code block segment is very low quality, 01 may indicate a code block segment is relatively low quality, 10 may indicate a code block segment is relatively high quality, and 11 may indicate a code block segment is very high quality.

In one example, the CSI report may include a bitmap indicating the code block segment qualities, where a length of the bitmap corresponds to at least a number of the code block segments. For instance, referring to FIG. 10, the UE 1002 may quantize and report the quality of each of the M code block segments in bitmap 1032. For instance, if the UE determines and quantizes each code block segment quality into a single bit $Q$ (i.e., $Q=1$) based on a single threshold comparison as described above, the UE may report M bits for each code block (one bit for each code block segment) in the bitmap to the base station. As an example, referring to FIG. 7, if M=4 for a given code block and the UE determines and quantizes the first segment as 0 (low quality), the second segment as 1 (high quality), the third segment as 0 (low quality), and the fourth segment as 1 (high quality), the UE may report the following four-bit bitmap to the base station for that code block: 0101. In another example, if the UE determines and quantizes each code block segment quality into multiple bits $Q$ (e.g., with soft information) based on a multiple threshold comparison as described above, the UE may report M*$Q$ bits in the bitmap to the base station, where $Q$ represents the number of quantization bits per code block segment. As an example, referring again to FIG. 7, if M=4 and $Q$=2 for a given code block and the UE determines and quantizes the first segment as 00 (very low quality), the second segment as 11 (very high quality), the third segment as 01 (relatively low quality), and the fourth segment as 10 (relatively high quality), the UE may report the following eight-bit bitmap to the base station for that code block: 00110110.

In one example, the CSI report may include an index for each of K code block segments having a worst code block segment quality of the code block segment qualities. For instance, referring to FIGS. 9 and 10, the UE 1002 may report the indices 904, 1034 of K worst segments of the M code block segments 704 in CSI report 1030. The K worst code block segments may be those code block segments for which the UE determines the lowest quality among the M code block segment qualities (e.g., based on any of the example functions described above or from a different metric). For example, if M=4, $Q$=1, and K=2 for a given code block, and the UE determines and quantizes the first segment as 0 (low quality), the second segment as 1 (high quality), the third segment as 0 (low quality), and the fourth segment as 1 (high quality) such as described in the example above, the UE may provide the indices of only the first segment and the third segment in the CSI report (e.g., segment index 1 and segment index 3) since these K=2 segments include the worst code block segment qualities (low quality) of all M=4 segments.

Moreover, the code block segment qualities included in the CSI report may correspond to the K code block segments. For instance, referring to FIGS. 9 and 10, if the UE determines code block segment quality at block 1012 based on a single threshold which is quantized into a single bit (e.g., $Q$=1), the UE may indicate the qualities 1014 of the K worst code block segments through reporting of their corresponding indices 904, 1034. For instance, the UE may indicate a code block segment is low quality simply by including that segment's index in the CSI report. Alternatively, if the UE 1002 determines code block segment quality 1014 at block 1012 based on multiple thresholds which is quantized into at least two bits (e.g., $Q$ ≥2), the UE may directly report the quality 906 of the K worst code block segments as well as the indices 904, 1034. For example, if M=4, $Q$=2, and K=2 for a given code block and the UE determines and quantizes the first segment as 00 (very low quality), the second segment as 11 (very high quality), the third segment as 01 (relatively low quality), and the fourth segment as 10 (relatively high quality) such as described above, the UE may provide the indices as well as the qualities of the first segment and the third segment in the CSI report (e.g., quality 00 for segment 1 and quality 01 for segment 3) since these K=2 segments include the worst code block segment qualities of all M=4 segments.

In one example, the value of K may be indicated in a RRC configuration or a MAC-CE. For instance, referring to FIG. 10, the UE 1002 may determine the value of K from the RRC configuration 1006 or MAC-CE 1008 provided by the base station 1004.

In one example, the code block may be a non-acknowledged code block and the CSI report may include an index for the non-acknowledged code block, and each of the code block segment qualities included in the CSI report may be associated with the non-acknowledged code block. For instance, referring to FIGS. 9 and 10, if the UE fails to decode one of the code blocks 1010 due to low LLR quality, e.g., by identifying a mismatch between an appended CRC and a computed CRC during a CRC check, the UE may determine to provide a NACK for that code block which the UE failed to decode, and the UE may include the index 902, 1036 of the non-acknowledged code block in the CSI report 1030. Moreover, the code block segment qualities 1014 included in the CSI report 1030 may be associated with a non-acknowledged code block, for instance, as illustrated in FIG. 9, where the index 902 of the non-acknowledged code block precedes the indices 904 of the K worst code block segments for the non-acknowledged code block and the code block segment qualities 906 of these K worst code block segments (when Q≥2) in the CSI report.

In one example, a length of the code block may equal a length of a transport block. For instance, referring to FIGS. 5 and 10, if the base station 504, 1004 does not perform code block segmentation at block 512 due to the transport block 506, 546 with appended CRC being no larger than a maximum configured code block size, then the code block 1010 may have a length equal to the length of the transport block (e.g., the total length of transport block and CRC).

At 1108, the UE may receive DCI for another code block from the base station in response to the CSI report sent at 1106, where the DCI includes at least one of a RV index for the another code block, a starting bit and a number of bits for the another code block in a circular buffer, the starting bit and an ending bit for the another code block in the circular buffer, a resource element allocation indicating the starting bit and the ending bit for the another code block, or an offset for the starting bit associated with the RV index for the another code block. For example, 1108 may be performed by DCI component 1346. For instance, referring to FIG. 10, after the base station 1004 receives the CSI report 1030 from the UE 1002, the base station 1004 may transmit a DCI 1038 scheduling one or more code blocks 1040 to the UE 1002. The code block(s) 1040 may be retransmissions of the code block(s) 1010 in response to the CSI report 1030. The DCI 1038 may include an RV index for the code block(s) 1040 (e.g., a different RV index than for code block(s) 1010), a starting bit and length (e.g., number of bits) for the code block(s) 1040 in circular buffer 602, 702, a starting bit and ending bit for the code block(s) 1040 in circular buffer 602, 702, a resource element allocation (e.g., TDRA and/or FDRA) indicating the starting bit and ending bit for the code block(s) 1040, or an offset for the starting bit associated with an RV index in the code block(s) 1040.

Figure 12:
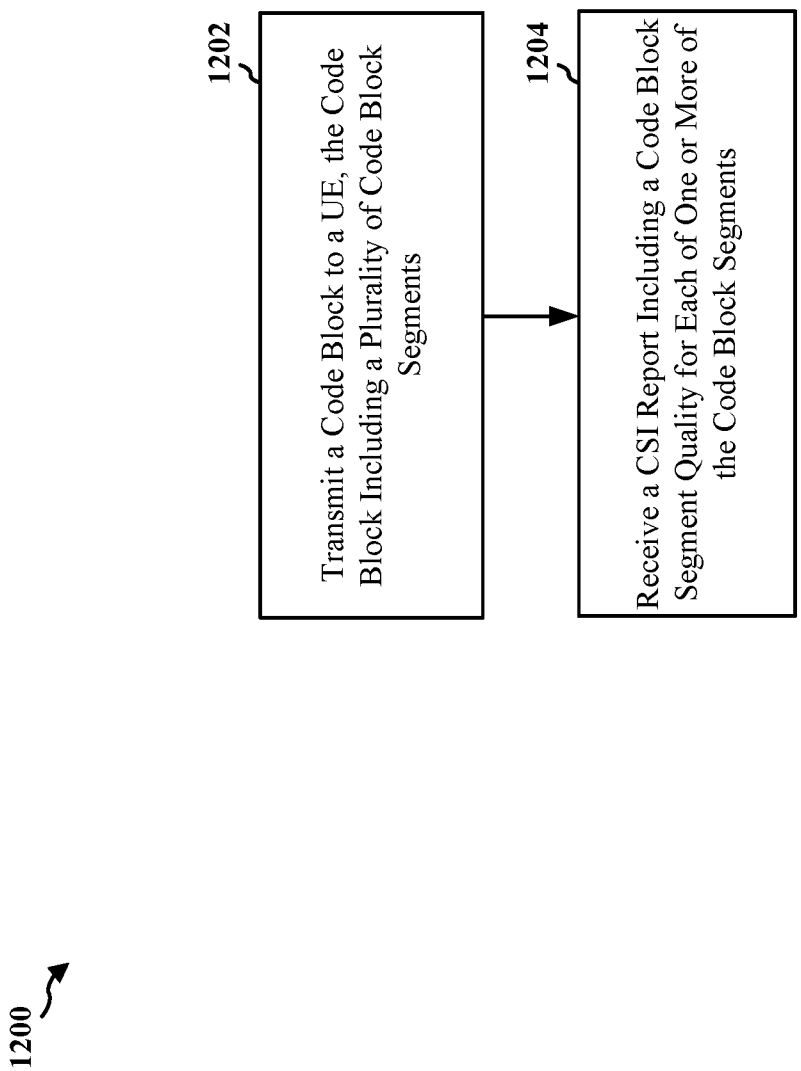
FIG. 12 is a flowchart of a method of wireless communication at a base station.

FIG. 12 is a flowchart 1200 of a method of wireless communication. The method may be performed by a base station (e.g., the base station 102/180, 310, 504, 1004; the apparatus 1402). The method allows a base station to segment a code block into individual code block segments and to receive in a CSI report a quality of one or more of these code block segments from a UE (e.g., the UE 104, 350, 502, 1002). The code block segment qualities allow the base station to determine which segments of the code block are to be re-transmitted, for example, based on a best RV to be applied for the code block retransmission, thereby improving retransmission performance.

At 1202, the base station transmits a code block to a UE, the code block including a plurality of code block segments. For example, 1202 may be performed by code block component 1440. For instance, referring to FIGS. 5, 7, and 10, the base station 1004 may transmit one or more code blocks 1010 to a UE 1002 (e.g., code blocks 542 or encoded code blocks 538), where each of the code blocks includes multiple code block segments 704.

At 1204, the base station receives a CSI report including a code block segment quality for each of one or more of the code block segments. For example, 1204 may be performed by CSI report component 1442. For instance, referring to FIG. 10, the base station 1004 may receive CSI report 1030 from the UE 1002 including one or more of the code block segment qualities 1014 determined at block 1012. In one example, the CSI report may include a bitmap 1032 of length M*Q, and the bitmap may include the code block segment quality (in the form of quantization 1028) for each code block segment 704 of a code block. In another example, referring also to FIG. 9, the CSI report may include indices 904, 1034 for K code block segments having the worst code block segment quality, through which indices the code block segment qualities may be indicated (e.g., by their presence in the report). Where Q≥2 is configured for a non-acknowledged code block, the CSI report may also include the quantization 1028 of each of the K code block segments (e.g., as qualities 906 in the report).

In one example, each of the code block segment qualities may be a function of an input LLR vector to a decoder of the UE, an output LLR vector from the decoder, or the input LLR vector and the output LLR vector. For instance, referring to FIGS. 7, 8, and 10, the code block segment quality 1014 of each of the code block segments 704 may be based on the input LLR vector 804 to LDPC decoder 802 for the segment, the output LLR vector 808 from LDPC decoder 802 for the segment, or both the input and output LLR vectors for the segment. For instance, for each code block segment, the UE may calculate an agreed metric between the base station 1004 and the UE which is a function (e.g., function 1016) of the input LLR vector, output LLR vector, or both LLR vectors, and the UE may compare that metric with a configured threshold Z. If the metric is less than the threshold Z, the UE may determine that the code block segment has low quality (e.g., low LLR quality or energy), while if the metric is greater than or equal to the threshold, the UE may determine that the code block segment has high quality (e.g., high LLR quality or energy).

In one example, the function may be indicated in a RRC configuration or a MAC-CE. For instance, referring to FIG. 10, the base station 1004 may select one of multiple configurations of function 1016 from which the UE 1002 may calculate output 1022. For instance, the base station may provide RRC configuration 1006 or MAC-CE 1008 indicating whether the UE is to calculate the metric for a code block segment based on an input LLR vector norm, an output LLR vector norm, a weighted sum of an input LLR vector norm and output LLR vector norm, a number of threshold-exceeding LLRs for an input LLR vector, a number of threshold-exceeding LLRs for an output LLR vector, a weighted sum of the number of threshold-exceeding LLRs for both the input LLR vector and the output LLR vector, or some other configured function. For example, the base station may include one or more bits in the RRC configuration or MAC-CE indicating whether the UE is to apply Equations (1), (2), (3), or (4) above for determining and reporting quality of a code block segment.

In one example, the CSI report may include a bitmap indicating each of the code block segment qualities, where a length of the bitmap corresponds to at least a number of the code block segments. For instance, referring to FIG. 10, the base station 1004 may receive from UE 1002 in the CSI report 1030 the quality of each of the M code block segments in bitmap 1032. For instance, if the UE determines and quantizes each code block segment quality into a single bit $Q$ (i.e., $Q$ =1) based on a single threshold comparison as described above, the UE may report M bits for each code block (one bit for each code block segment) in the bitmap to the base station. As an example, referring to FIG. 7, if M=4 for a given code block and the UE determines and quantizes the first segment as 0 (low quality), the second segment as 1 (high quality), the third segment as 0 (low quality), and the fourth segment as 1 (high quality), the UE may report the following four-bit bitmap to the base station for that code block: 0101. In another example, if the UE determines and quantizes each code block segment quality into multiple bits $Q$ (e.g., with soft information) based on a multiple threshold comparison as described above, the UE may report M* $Q$ bits in the bitmap to the base station, where $Q$ represents the number of quantization bits per code block segment. As an example, referring again to FIG. 7, if M=4 and $Q$ =2 for a given code block and the UE determines and quantizes the first segment as 00 (very low quality), the second segment as 11 (very high quality), the third segment as 01 (relatively low quality), and the fourth segment as 10 (relatively high quality), the UE may report the following eight-bit bitmap to the base station for that code block: 00110110.

In one example, the CSI report may include an index for each of K code block segments having a worst code block segment quality of the code block segment qualities. For instance, referring to FIGS. 9 and 10, the UE 1002 may report the indices 904, 1034 of K worst segments of the M code block segments 704 in CSI report 1030 to base station 1004. The K worst code block segments may be those code block segments for which the UE determines the lowest quality among the M code block segment qualities (e.g., based on any of the example functions described above or from a different metric). For example, if M=4, $Q$ =1, and K=2 for a given code block, and the UE determines and quantizes the first segment as 0 (low quality), the second segment as 1 (high quality), the third segment as 0 (low quality), and the fourth segment as 1 (high quality) such as described in the example above, the UE may provide the indices of only the first segment and the third segment in the CSI report (e.g., segment index 1 and segment index 3) since these K=2 segments include the worst code block segment qualities (low quality) of all M=4 segments.

Moreover, each of the code block segment qualities in the CSI report may correspond to the K code block segments. For instance, referring to FIGS. 9 and 10, if the UE determines code block segment quality at block 1012 based on a single threshold which is quantized into a single bit (e.g., $Q$ =1), the UE may indicate the qualities 1014 of the K worst code block segments through reporting of their corresponding indices 904, 1034 to base station 1004. For instance, the UE may indicate a code block segment is low quality simply by including that segment's index in the CSI report. Alternatively, if the UE 1002 determines code block segment quality 1014 at block 1012 based on multiple thresholds which is quantized into at least two bits (e.g., $Q$ ≥2), the UE may directly report the quality 906 of the K worst code block segments as well as the indices 904, 1034. For example, if M=4, $Q$ =2, and K=2 for a given code block and the UE determines and quantizes the first segment as 00 (very low quality), the second segment as 11 (very high quality), the third segment as 01 (relatively low quality), and the fourth segment as 10 (relatively high quality) such as described above, the UE may provide the indices as well as the qualities of the first segment and the third segment in the CSI report (e.g., quality 00 for segment 1 and quality 01 for segment 3) since these K=2 segments include the worst code block segment qualities of all M=4 segments.

In one example, a value of K may be indicated in a radio resource control (RRC) configuration or a medium access control (MAC) control element (MAC-CE). For instance, referring to FIG. 10, the base station 1004 may indicate the value of K in the RRC configuration 1006 or MAC-CE 1008.

Figure 13:
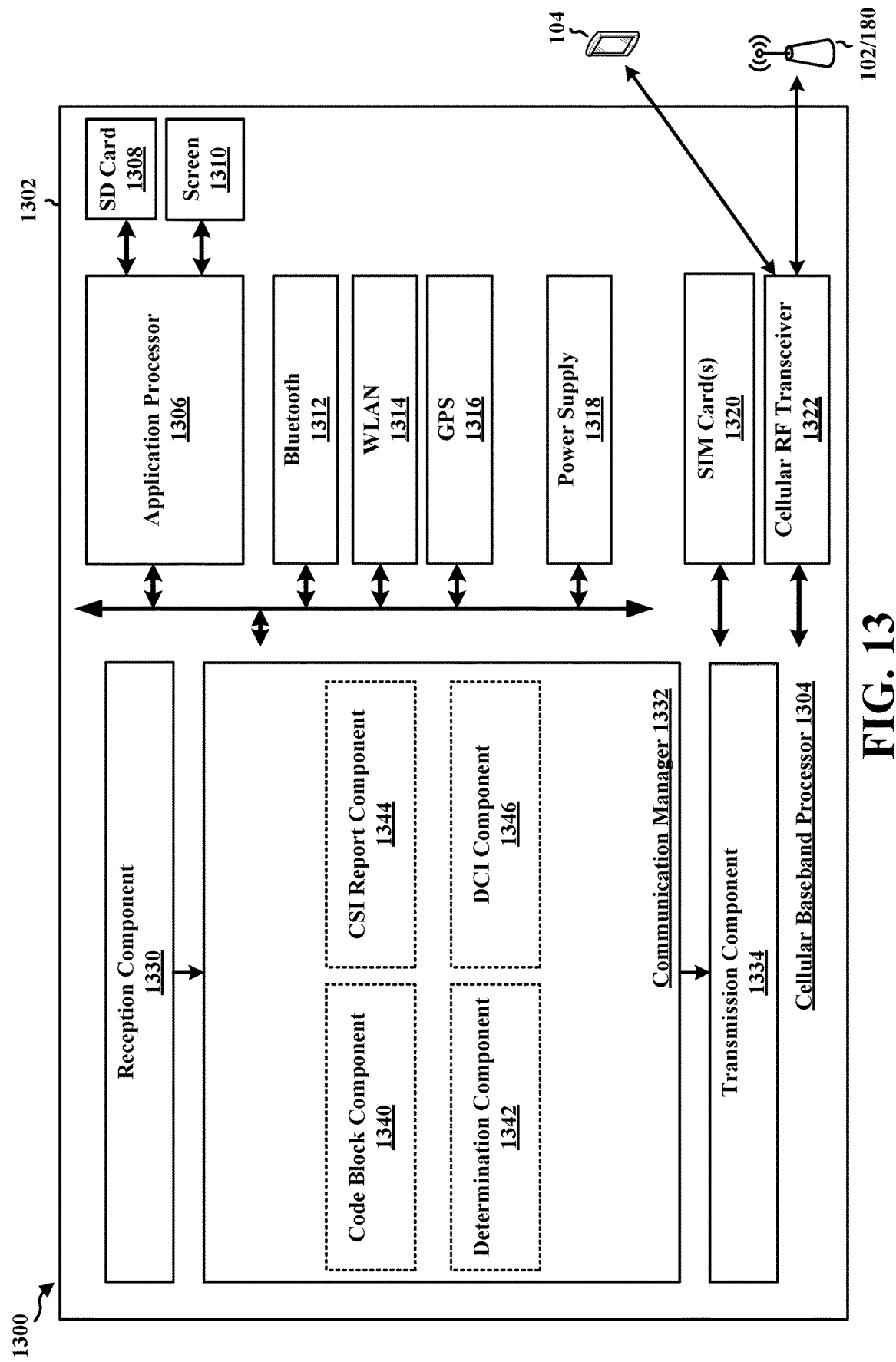
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/ memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the aforediscussed additional modules of the apparatus 1302.

The communication manager 1332 includes a code block component 1340 that is configured to receive a code block from a base station, the code block including a plurality of code block segments, e.g., as described in connection with 1102. The communication manager 1332 further includes a determination component 1342 that receives input in the form of the code block segments from the code block component 1340 and is configured to determine a code block segment quality of each of the code block segments, e.g., as described in connection with 1104. The communication manager 1332 further includes a CSI report component 1344 that receives input in the form of the code block segment qualities from the determination component 1342 and is configured to send a CSI report including one or more of the code block segment qualities, e.g., as described in connection with 1106. The communication manager 1332 further includes a DCI component 1346 that receives input in the form of the CSI report from the CSI report component 1344 and is configured to receive DCI for another code block from the base station in response to the CSI report, e.g., as described in connection with 1108.

The apparatus may include additional components that perform each of the blocks of the algorithm in the aforementioned flowcharts of FIGS. 10 and 11. As such, each block in the aforementioned flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for receiving a code block from a base station, the code block including a plurality of code block segments; means for determining a code block segment quality of each of the code block segments; and means for sending a channel state information (CSI) report including one or more of the code block segment qualities. In one configuration, the means for receiving may be further configured to receive DCI for another code block from the base station in response to the CSI report, where the DCI includes at least one of a RV index for the another code block, a starting bit and a number of bits for the another code block in a circular buffer, the starting bit and an ending bit for the another code block in the circular buffer, a resource element allocation indicating the starting bit and the ending bit for the another code block, or an offset for the starting bit associated with the RV index for the another code block.

The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
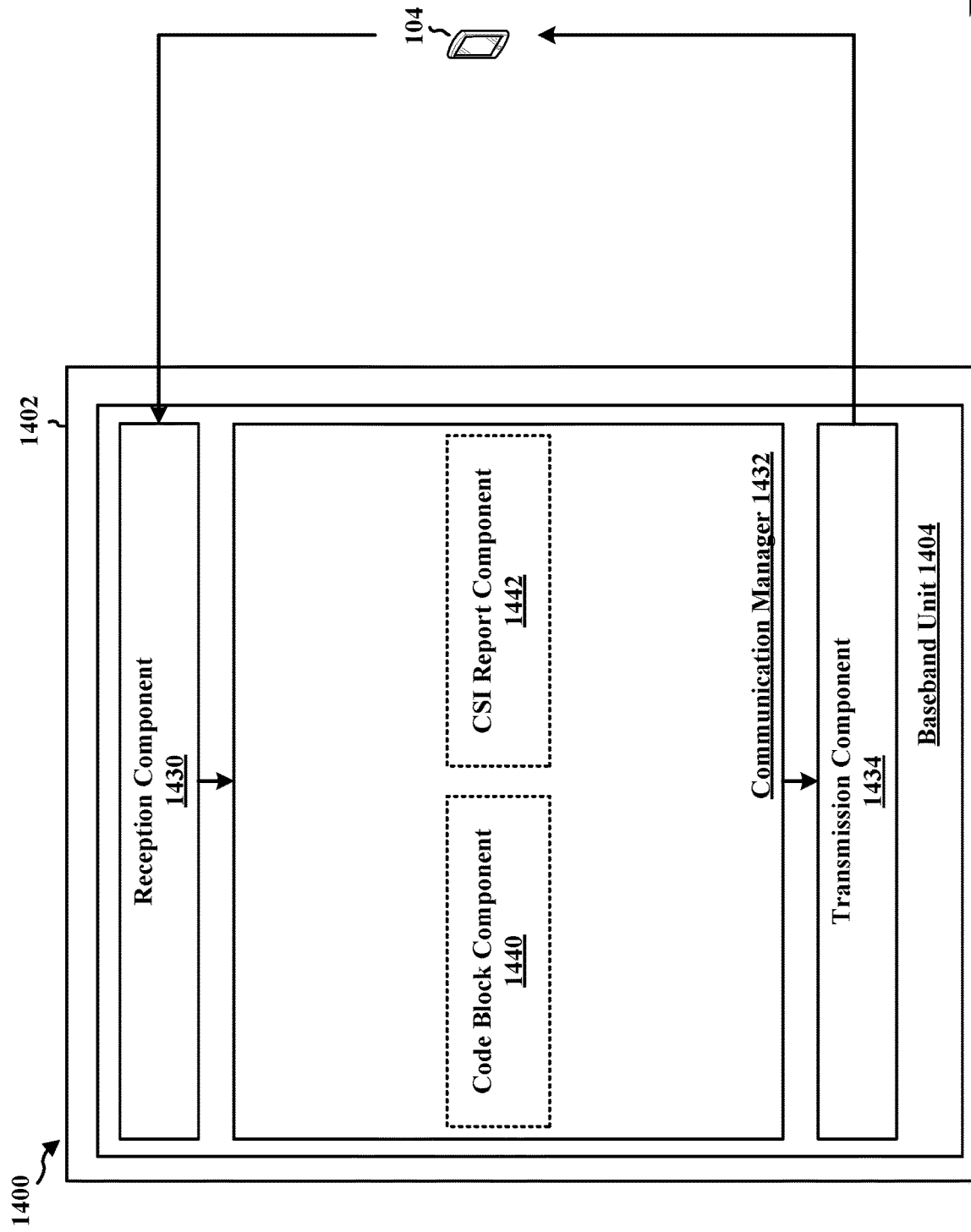
FIG. 14 is a diagram illustrating another example of a hardware implementation for another example apparatus.

FIG. 14 is a diagram 1400 illustrating an example of a hardware implementation for an apparatus 1402. The apparatus 1402 is a BS and includes a baseband unit 1404. The baseband unit 1404 may communicate through a cellular RF transceiver with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the BS 310 and may include the memory 376 and/or at least one of the TX processor 316, the RX processor 370, and the controller/processor 375.

The communication manager 1432 includes a code block component 1440 that is configured to transmit a code block to a UE, the code block including a plurality of code block segments, e.g., as described in connection with 1202. The communication manager 1432 further includes a CSI report component 1442 that is configured to receive a CSI report including a code block segment quality for each of one or more of the code block segments, e.g., as described in connection with 1204.

The apparatus may include additional components that perform each of the blocks of the algorithm in the aforementioned flowcharts of FIGS. 10 and 12. As such, each block in the aforementioned flowcharts of FIGS. 10 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for transmitting a code block to a user equipment (UE), the code block including a plurality of code block segments; and means for receiving a channel state information (CSI) report including a code block segment quality for each of one or more of the code block segments.

The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Accordingly, aspects of the present disclosure allow a base station to segment a code block into individual code block segments and a UE to determine and indicate a quality of the individual code block segments in a CSI report to a base station. The code block segment qualities indicated by the UE allow the base station to determine which segments of the code block are to be re-transmitted, for example, based on a best RV to be applied for the code block retransmission, thereby improving retransmission performance.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: receiving a code block from a base station, the code block including a plurality of code block segments; determining a code block segment quality of each of the code block segments; and sending a channel state information (CSI) report including one or more of the code block segment qualities.

Example 2 is the method of Example 1, wherein the code block segments include uniform boundaries.

Example 3 is the method of Example 1, wherein the code block segments include non-uniform boundaries indicated in a radio resource control (RRC) configuration or a medium access control (MAC) control element (MAC-CE).

Example 4 is the method of any of Examples 1-3, wherein the code block segment quality of each of the code block segments is determined based on a function of: an input log-likelihood ratio (LLR) vector to a decoder of the UE; an output LLR vector from the decoder; or the input LLR vector and the output LLR vector.

Example 5 is the method of Example 4, wherein an output of the function comprises: a norm of the input LLR vector or the output LLR vector; or a number of LLRs exceeding a threshold in the input LLR vector or the output LLR vector.

Example 6 is the method of Examples 4 or 5, wherein the code block segment quality is determined in response to a comparison of an output of the function with a threshold.

Example 7 is the method of Examples 4 or 5, wherein the code block segment quality is determined in response to a comparison of an output of the function with multiple thresholds.

Example 8 is the method of any of Examples 4-7, wherein the function is indicated in a radio resource control (RRC) configuration or a medium access control (MAC) control element (MAC-CE).

Example 9 is the method of any of Examples 4-8, wherein each of the code block segment qualities in the CSI report comprises a quantization of an output of the function.

Example 10 is the method of any of Examples 1-9, wherein the CSI report includes a bitmap indicating the code block segment qualities, wherein a length of the bitmap corresponds to at least a number of the code block segments.

Example 11 is the method of any of Examples 1-9, wherein the CSI report includes an index for each of K code block segments having a worst code block segment quality of the code block segment qualities, and the code block segment qualities included in the CSI report correspond to the K code block segments.

Example 12 is the method of Example 11, wherein a value of K is indicated in a radio resource control (RRC) configuration or a medium access control (MAC) control element (MAC-CE).

Example 13 is the method of any of Examples 1-12, wherein the code block is a non-acknowledged code block and the CSI report includes an index for the non-acknowledged code block, and each of the code block segment qualities included in the CSI report is associated with the non-acknowledged code block.

Example 14 is the method of any of Examples 1-13, further comprising: receiving downlink control information (DCI) for another code block from the base station in response to the CSI report, wherein the DCI includes at least one of: a redundancy version (RV) index for the another code block; a starting bit and a number of bits for the another code block from a circular buffer; the starting bit and an ending bit for the another code block from the circular buffer; a resource element allocation indicating the starting bit and the ending bit for the another code block; or an offset for the starting bit associated with the RV index for the another code block.

Example 15 is an apparatus for wireless communication, comprising: a processor; memory coupled with the processor; and instructions stored in the memory and operable, when executed by the processor, to cause the apparatus to: receive a code block from a base station, the code block including a plurality of code block segments; determine a code block segment quality of each of the code block segments; and send a channel state information (CSI) report including one or more of the code block segment qualities.

Example 16 is the apparatus of Example 15, wherein the code block segment quality of each of the code block segments is determined based on a function of: an input log-likelihood ratio (LLR) vector to a decoder of the UE; an output LLR vector from the decoder; or the input LLR vector and the output LLR vector.

Example 17 is the apparatus of Example 16, wherein the code block segment quality is determined in response to a comparison of an output of the function with a threshold.

Example 18 is the apparatus of Example 16, wherein the code block segment quality is determined in response to a comparison of an output of the function with multiple thresholds.

Example 19 is the apparatus of any of Examples 15-18, wherein the CSI report includes a bitmap indicating the code block segment qualities, wherein a length of the bitmap corresponds to at least a number of the code block segments.

Example 20 is the apparatus of any of Examples 15-18, wherein the CSI report includes an index for each of K code block segments having a worst code block segment quality of the code block segment qualities, and the code block segment qualities included in the CSI report correspond to the K code block segments.

Example 21 is a method of wireless communication at a base station, comprising: transmitting a code block to a user equipment (UE), the code block including a plurality of code block segments; and receiving a channel state information (CSI) report including a code block segment quality for each of one or more of the code block segments.

Example 22 is the method of Example 21, wherein each of the code block segment qualities is a function of: an input log-likelihood ratio (LLR) vector to a decoder of the UE; an output LLR vector from the decoder; or the input LLR vector and the output LLR vector.

Example 23 is the method of Example 22, wherein the function is indicated in a radio resource control (RRC) configuration or a medium access control (MAC) control element (MAC-CE).

Example 24 is the method of any of Examples 21-23, wherein the CSI report includes a bitmap indicating each of the code block segment qualities, wherein a length of the bitmap corresponds to at least a number of the code block segments.

Example 25 is the method of any of Examples 21-23, wherein the CSI report includes an index for each of K code block segments having a worst code block segment quality of the code block segment qualities, and each of the code block segment qualities in the CSI report correspond to the K code block segments.

Example 26 is the method of Example 25, wherein a value of K is indicated in a radio resource control (RRC) configuration or a medium access control (MAC) control element (MAC-CE).

Example 27 is an apparatus for wireless communication, comprising: a processor; memory coupled with the processor; and instructions stored in the memory and operable, when executed by the processor, to cause the apparatus to: transmit a code block to a user equipment (UE), the code block including a plurality of code block segments; and receive a channel state information (CSI) report including a code block segment quality for each of one or more of the code block segments.

Example 28 is the apparatus of Example 27, wherein each of the code block segment qualities is a function of: an input log-likelihood ratio (LLR) vector to a decoder of the UE; an output LLR vector from the decoder; or the input LLR vector and the output LLR vector.

Example 29 is the apparatus of Examples 27 or 28, wherein the CSI report includes a bitmap indicating each of the code block segment qualities, wherein a length of the bitmap corresponds to at least a number of the code block segments.

Example 30 is the apparatus of Examples 27 or 28, wherein the CSI report includes an index for each of K code block segments having a worst code block segment quality of the code block segment qualities, and each of the code block segment qualities in the CSI report correspond to the K code block segments.

What is claimed is:

1. A method of wireless communication at a user equipment (UE), comprising:

receiving a code block from a base station, the code block being a segment of a transport block, and the code block including a plurality of code block segments having boundaries configured or indicated from the base station;

determining a code block segment quality of each of the code block segments; and sending a channel state information (CSI) report including one or more of the code block segment qualities.

2. The method of claim 1, wherein the code block segments include uniform boundaries.

3. The method of claim 1, wherein the code block segments include non-uniform boundaries indicated in a radio resource control (RRC) configuration or a medium access control (MAC) control element (MAC-CE).

4. The method of claim 1, wherein the code block segment quality of each of the code block segments is determined based on a function of:

an input log-likelihood ratio (LLR) vector to a decoder of the UE;

an output LLR vector from the decoder; or the input LLR vector and the output LLR vector.

5. The method of claim 4, wherein an output of the function comprises:

a norm of the input LLR vector or the output LLR vector; or a number of LLRs exceeding a threshold in the input LLR vector or the output LLR vector.

6. The method of claim 4, wherein the code block segment quality is determined in response to a comparison of an output of the function with a threshold.

7. The method of claim 4, wherein the code block segment quality is determined in response to a comparison of an output of the function with multiple thresholds.

8. The method of claim 4, wherein the function is indicated in a radio resource control (RRC) configuration or a medium access control (MAC) control element (MAC-CE).

9. The method of claim 4, wherein each of the code block segment qualities in the CSI report comprises a quantization of an output of the function.

10. The method of claim 1, wherein the CSI report includes a bitmap indicating the code block segment qualities, wherein a length of the bitmap corresponds to at least a number of the code block segments.

11. The method of claim 1, wherein the CSI report includes an index for each of K code block segments having a worst code block segment quality of the code block segment qualities, and the code block segment qualities included in the CSI report correspond to the K code block segments.

12. The method of claim 11, wherein a value of K is indicated in a radio resource control (RRC) configuration or a medium access control (MAC) control element (MAC-CE).

13. The method of claim 1, wherein the code block is a non-acknowledged code block and the CSI report includes an index for the non-acknowledged code block, and each of the code block segment qualities included in the CSI report is associated with the non-acknowledged code block.

14. The method of claim 1, further comprising:

receiving downlink control information (DCI) for another code block from the base station in response to the CSI report, wherein the DCI includes at least one of:

a redundancy version (RV) index for the another code block;

a starting bit and a number of bits for the another code block from a circular buffer;

the starting bit and an ending bit for the another code block from the circular buffer;

a resource element allocation indicating the starting bit and the ending bit for the another code block; or an offset for the starting bit associated with the RV index for the another code block.

15. An apparatus for wireless communication, comprising:

a processor;

memory coupled with the processor; and instructions stored in the memory and operable, when executed by the processor, to cause the apparatus to:

receive a code block from a base station, the code block being a segment of a transport block, and the code block including a plurality of code block segments having boundaries configured or indicated from the base station;

determine a code block segment quality of each of the code block segments; and send a channel state information (CSI) report including one or more of the code block segment qualities.

16. The apparatus of claim 15, wherein the code block segment quality of each of the code block segments is determined based on a function of:

an input log-likelihood ratio (LLR) vector to a decoder of the apparatus;

an output LLR vector from the decoder; or the input LLR vector and the output LLR vector.

17. The apparatus of claim 16, wherein the code block segment quality is determined in response to a comparison of an output of the function with a threshold.

18. The apparatus of claim 16, wherein the code block segment quality is determined in response to a comparison of an output of the function with multiple thresholds.

19. The apparatus of claim 15, wherein the CSI report includes a bitmap indicating the code block segment qualities, wherein a length of the bitmap corresponds to at least a number of the code block segments.

20. The apparatus of claim 15, wherein the CSI report includes an index for each of K code block segments having a worst code block segment quality of the code block segment qualities, and the code block segment qualities included in the CSI report correspond to the K code block segments.

21. A method of wireless communication at a base station, comprising:

transmitting a code block to a user equipment (UE), the code block being a segment of a transport block, and the code block including a plurality of code block segments having boundaries configured or indicated to the UE; and receiving a channel state information (CSI) report including a code block segment quality for each of one or more of the code block segments.

22. The method of claim 21, wherein each of the code block segment qualities is a function of:

an input log-likelihood ratio (LLR) vector to a decoder of the UE;

an output LLR vector from the decoder; or the input LLR vector and the output LLR vector.

23. The method of claim 22, wherein the function is indicated in a radio resource control (RRC) configuration or a medium access control (MAC) control element (MAC-CE).

24. The method of claim 21, wherein the CSI report includes a bitmap indicating each of the code block segment qualities, wherein a length of the bitmap corresponds to at least a number of the code block segments.

25. The method of claim 21, wherein the CSI report includes an index for each of K code block segments having a worst code block segment quality of the code block segment qualities, and each of the code block segment qualities in the CSI report correspond to the K code block segments.

26. The method of claim 25, wherein a value of K is indicated in a radio resource control (RRC) configuration or a medium access control (MAC) control element (MAC-CE).

27. An apparatus for wireless communication, comprising:
  a processor;
  memory coupled with the processor; and
  instructions stored in the memory and operable, when executed by the processor, to cause the apparatus to:
    transmit a code block to a user equipment (UE), the code block being a segment of a transport block, and the code block including a plurality of code block segments having boundaries configured or indicated to the UE; and
    receive a channel state information (CSI) report including a code block segment quality for each of one or more of the code block segments.

28. The apparatus of claim 27, wherein each of the code block segment qualities is a function of:
  an input log-likelihood ratio (LLR) vector to a decoder of the UE;
  an output LLR vector from the decoder; or
  the input LLR vector and the output LLR vector.

29. The apparatus of claim 27, wherein the CSI report includes a bitmap indicating each of the code block segment qualities, wherein a length of the bitmap corresponds to at least a number of the code block segments.

30. The apparatus of claim 27, wherein the CSI report includes an index for each of K code block segments having a worst code block segment quality of the code block segment qualities, and each of the code block segment qualities in the CSI report correspond to the K code block segments.

* * * * *